(12) United States Patent
Chen et al.

(10) Patent No.: US 11,805,197 B2
(45) Date of Patent: *Oct. 31, 2023

(54) DISPLAY METHOD AND TERMINAL

(71) Applicant: Huawei Technologies Co., Ltd., Shenzhen (CN)

(72) Inventors: Xiaoxiao Chen, Nanjing (CN); Yanyan Mao, Wuhan (CN); Hao Wu, Shanghai (CN); Qing Wang, Wuhan (CN); Hui Yi, Wuhan (CN); Weiching Chung, Shenzhen (CN); Bing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

This patent is subject to a terminal disclaimer.

(21) Appl. No.: 17/403,187

(22) Filed: Aug. 16, 2021

(65) Prior Publication Data

US 2022/0038568 A1  Feb. 3, 2022

Related U.S. Application Data

(63) Continuation of application No. 16/639,461, filed as application No. PCT/CN2017/097989 on Aug. 18, 2017, now Pat. No. 11,115,518.

(51) Int. Cl.
*H04M 1/72403* (2021.01)
*G06F 3/04817* (2022.01)
*H04M 1/72454* (2021.01)

(52) U.S. Cl.
CPC .... *H04M 1/72403* (2021.01); *G06F 3/04817* (2013.01); *H04M 1/72454* (2021.01); *G06F 2203/04803* (2013.01)

(58) Field of Classification Search
CPC ......... H04M 1/72403; H04M 1/72454; G06F 3/04817; G06F 2203/04803
USPC .......................................................... 455/418
See application file for complete search history.

(56) References Cited

U.S. PATENT DOCUMENTS

| | | | |
|---|---|---|---|
| 9,389,703 B1 | 7/2016 | Olsen et al. | |
| 10,248,289 B2* | 4/2019 | Feng | ..................... H04M 1/724 |
| 10,382,606 B2* | 8/2019 | Kim | .................... H04M 1/0216 |
| 10,970,092 B2* | 4/2021 | Choi | ..................... G06F 3/0486 |
| 11,068,064 B2* | 7/2021 | Boblett | .................. G06F 17/00 |
| 11,076,042 B2* | 7/2021 | Zhu | ..................... G06F 3/04817 |
| 2002/0160817 A1 | 10/2002 | Salmimaa et al. | |
| 2003/0063128 A1 | 4/2003 | Salmimaa et al. | |

(Continued)

FOREIGN PATENT DOCUMENTS

| | | |
|---|---|---|
| CN | 101957717 A | 1/2011 |
| CN | 102207825 A | 10/2011 |

(Continued)

*Primary Examiner* — Mong-Thuy T Tran
(74) *Attorney, Agent, or Firm* — Conley Rose, P.C.

(57) ABSTRACT

A terminal includes a display screen with an irregular shape and a front panel component disposed on a same layer as the display screen. The display screen includes a target region and a main display region. The display region is a complete rectangular region on the display screen. The target region is an irregular region other than the main display region on the display screen. A gap formed by the irregular region is a reserved region, and the front panel component is disposed in the reserved region.

20 Claims, 21 Drawing Sheets

(56) References Cited

U.S. PATENT DOCUMENTS

| | | | |
|---|---|---|---|
| 2006/0117108 A1* | 6/2006 | Salisbury | G06F 3/04845 |
| | | | 709/229 |
| 2009/0249247 A1* | 10/2009 | Tseng | G06F 3/0481 |
| | | | 715/835 |
| 2010/0235732 A1 | 9/2010 | Bergman | |
| 2013/0203462 A1 | 8/2013 | Tahk et al. | |
| 2014/0289668 A1 | 9/2014 | Mavrody | |
| 2016/0080551 A1 | 3/2016 | Tseng et al. | |
| 2016/0191837 A1 | 6/2016 | Huh et al. | |
| 2017/0038966 A1 | 2/2017 | Chaudhri et al. | |
| 2017/0068419 A1* | 3/2017 | Sundermeyer | G08B 25/008 |
| 2018/0121067 A1 | 5/2018 | Lee et al. | |
| 2018/0260803 A1 | 9/2018 | Seol et al. | |
| 2018/0307270 A1 | 10/2018 | Pantel | |
| 2018/0335921 A1* | 11/2018 | Karunamuni | G06F 3/04842 |
| 2019/0043452 A1 | 2/2019 | Silvanto et al. | |

FOREIGN PATENT DOCUMENTS

| | | |
|---|---|---|
| CN | 102946470 A | 2/2013 |
| CN | 204242144 C | 4/2015 |
| CN | 106569584 A | 4/2017 |
| CN | 106843654 A | 6/2017 |
| CN | 106921760 A | 7/2017 |
| CN | 106935144 A | 7/2017 |
| EP | 3113012 A2 | 1/2017 |
| EP | 3121779 A1 | 1/2017 |
| GB | 2552090 A | 1/2018 |
| WO | 2009097555 A2 | 8/2009 |
| WO | 2013061156 A2 | 5/2013 |
| WO | 2017047854 A1 | 3/2017 |
| WO | 2017058416 A1 | 4/2017 |

\* cited by examiner

Portrait-screen and non-full-screen mode

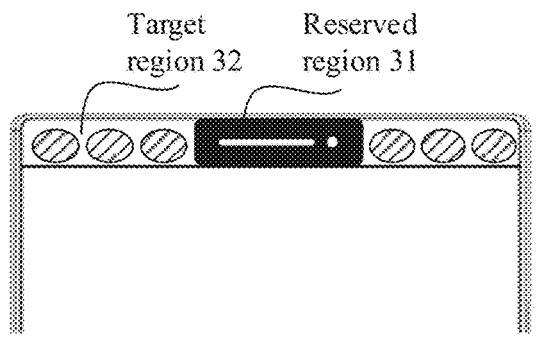
FIG. 14(a) Display template 1
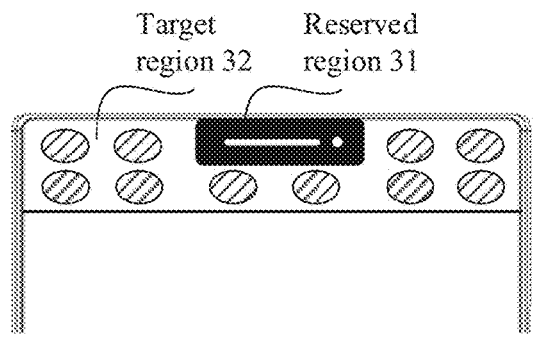
FIG. 14(b) Display template 2
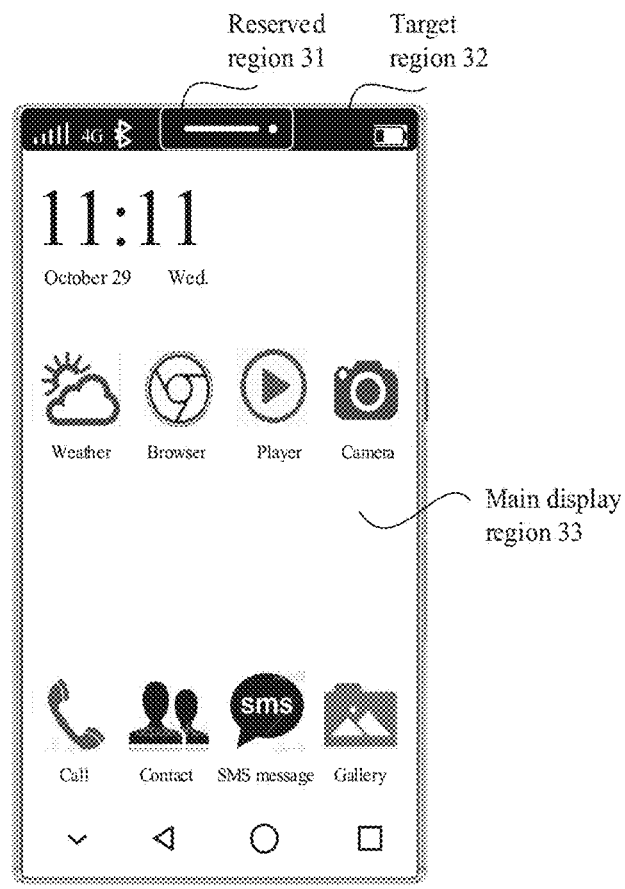
FIG. 15

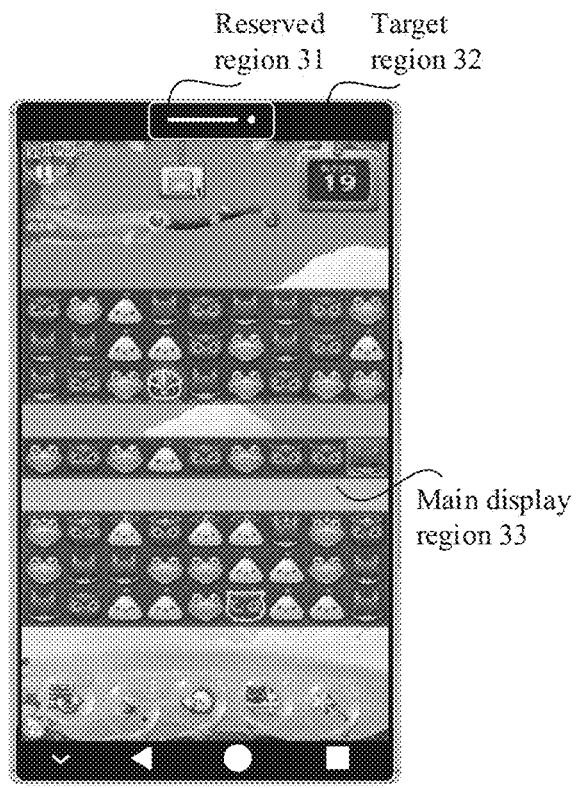 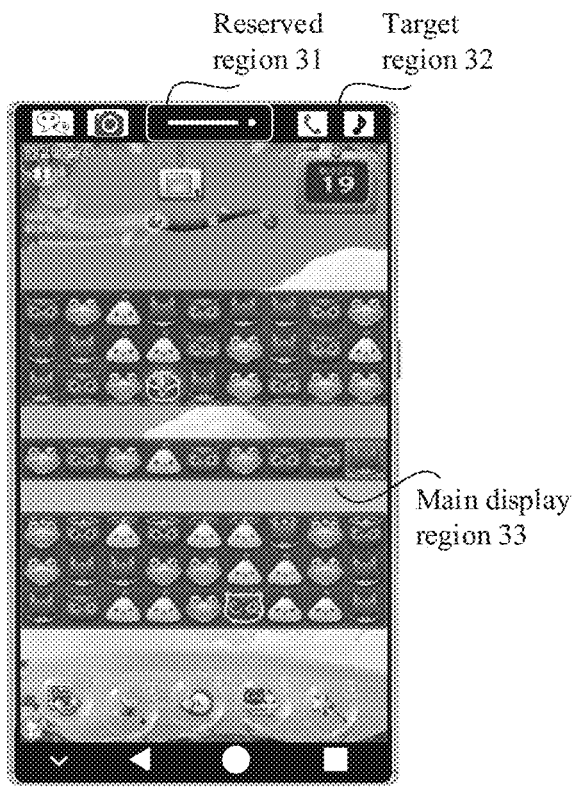
(a) Portrait and full-screen mode    (b) Portrait and full-screen mode
FIG. 17(a) Portrait and full-screen mode    FIG. 17(b) Portrait and full-screen mode

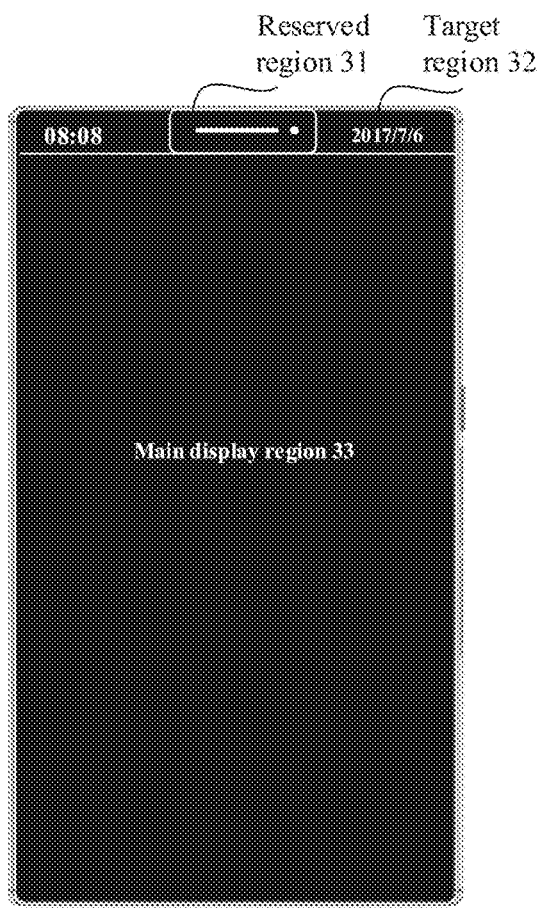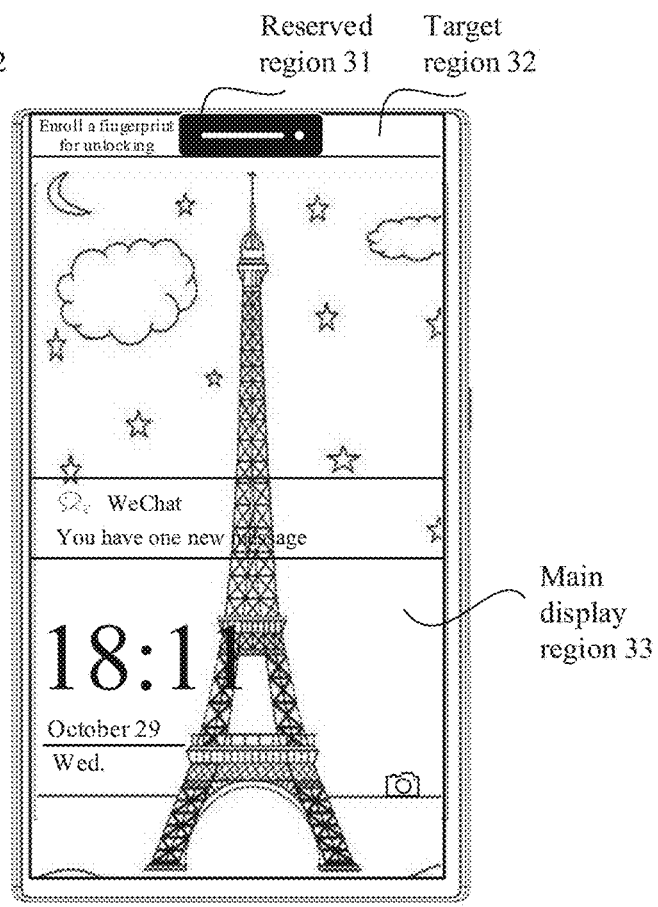
FIG. 21(a) Black screen state　　FIG. 21(b) Lock screen state

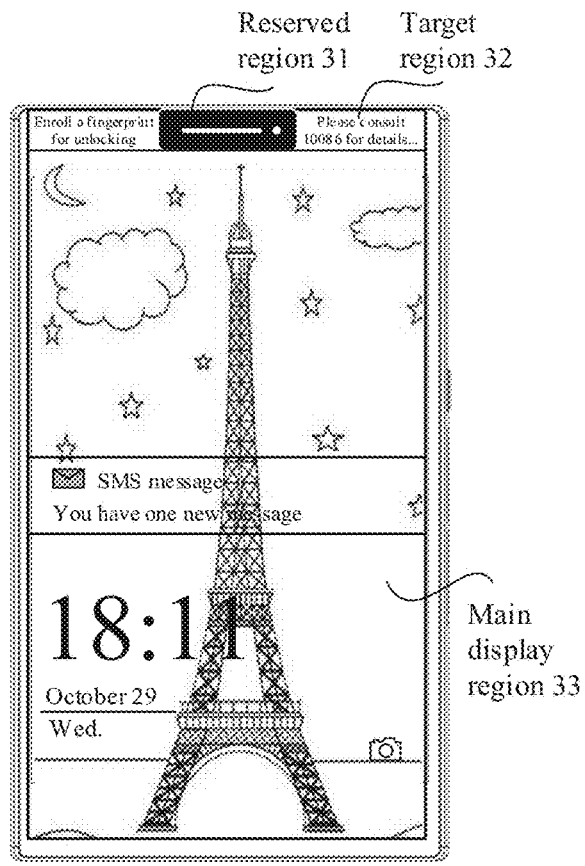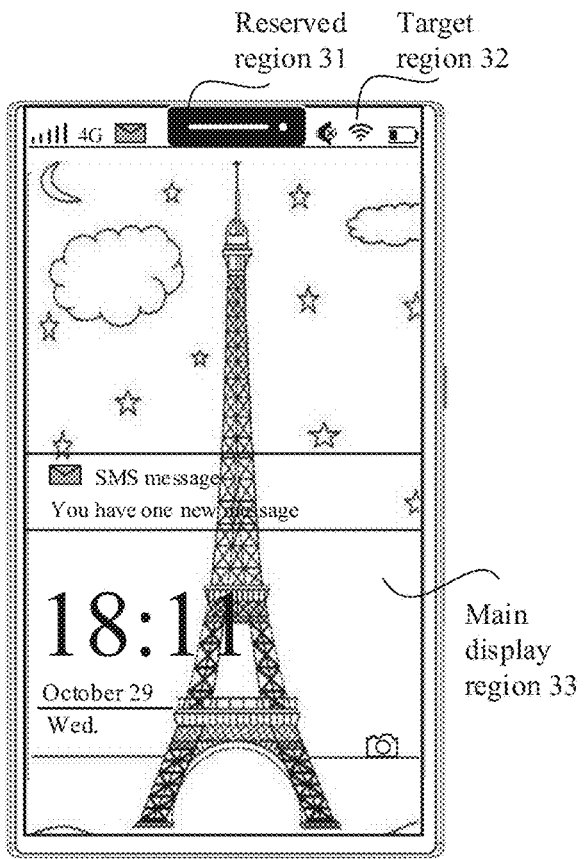
FIG. 22(a) Lock screen state    FIG. 22(b) Lock screen state

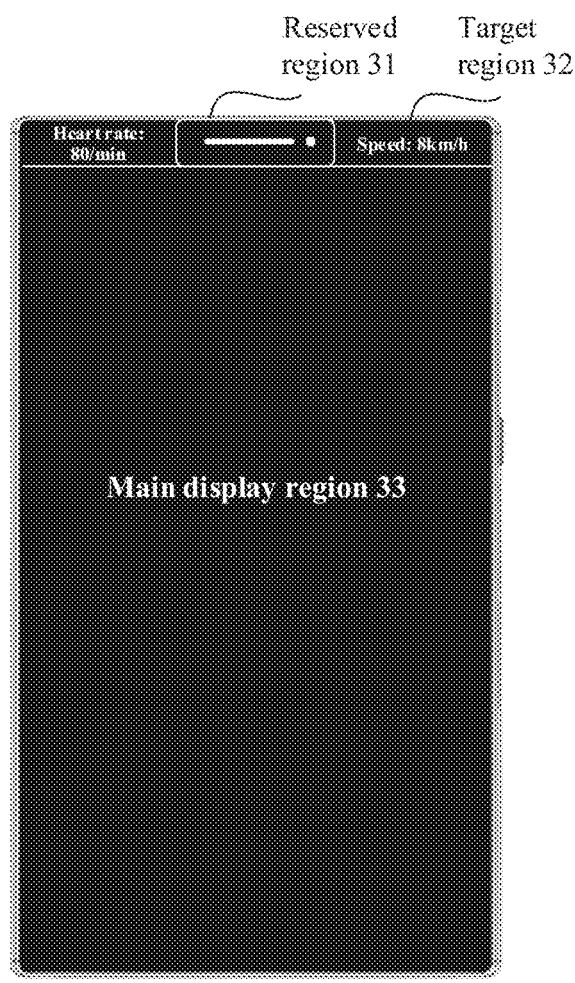 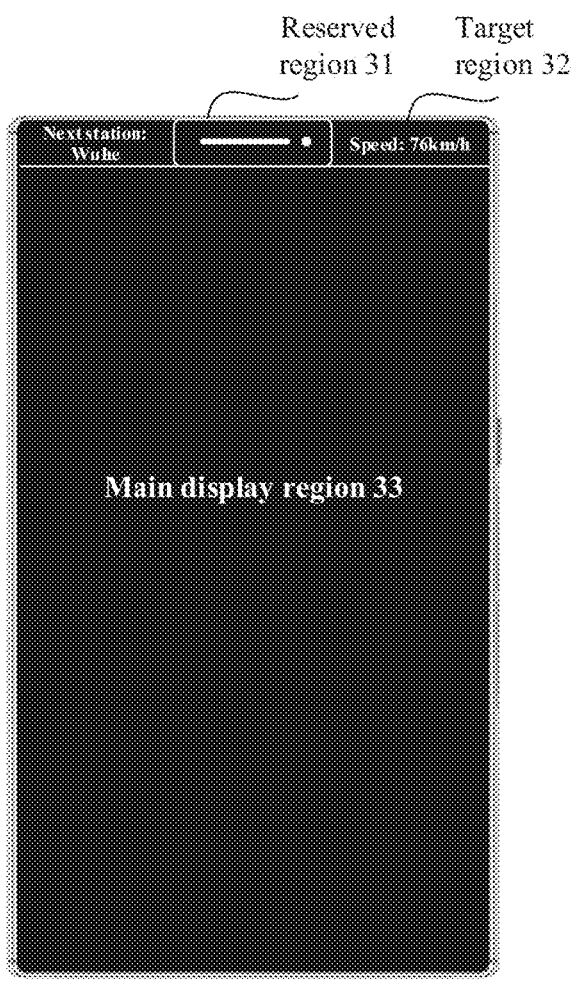
FIG. 23(a) Running state
FIG. 23(b) Vehicle taking state

DISPLAY METHOD AND TERMINAL

CROSS-REFERENCE TO RELATED APPLICATIONS

This is a continuation of U.S. patent application Ser. No. 16/639,461 filed on Feb. 14, 2020, which is a National Stage of International Patent Application No. PCT/CN2017/097989 filed on Aug. 18, 2017. Both of the aforementioned applications are hereby incorporated by reference in their entireties.

TECHNICAL FIELD

Embodiments of this application relate to the field of communications technologies, and in particular, to a display method and a terminal.

BACKGROUND

With development of mobile Internet technologies, large-screen terminals have been gradually accepted by users and become a trend. As shown in FIG. 1, a screen-to-body ratio is a ratio of an area of a display screen 01 to an area of a front panel 02 of a mobile phone. When the screen-to-body ratio is higher, an effective display region of the mobile phone is larger and a user obtains a better display effect. Therefore, how to increase the screen-to-body ratio of the mobile phone becomes one of problems that need to be urgently resolved currently.

SUMMARY

Embodiments of this application provide a display method and a terminal, so that an effective display region of an existing terminal can be increased without changing a front panel layout of the terminal, thereby increasing a screen-to-body ratio of the terminal.

To achieve the foregoing objective, the following technical solutions are used in the embodiments of this application.

According to a first aspect, an embodiment of this application provides a terminal, where the terminal includes: a processor, a memory, and an input device. In addition, a display screen with an irregular shape and a front panel component disposed on a same layer as the display screen are disposed on a front panel of the terminal. The display screen includes a target region and a main display region, the main display region is a complete rectangular region on the display screen, the target region is an irregular region other than the main display region on the display screen, and a gap formed by the irregular region is a reserved region, and the front panel component (for example, a front camera or an earpiece) is disposed in the reserved region. Compared with a conventional layout of the front panel of the terminal, this irregular layout mode of the display screen is capable of not affecting a layout of the front panel of the terminal and a thickness of the terminal while increasing an area of the effective display region of the terminal.

In a possible design method, the target region is used to display target display content associated with a current application scenario of the terminal, so that a display effect of the terminal and use experience of a user are improved while a relatively high screen-to-body ratio is ensured.

In a possible design method, when the terminal is in a portrait mode and is in a non-full-screen mode, the target display content includes a to-be-displayed icon in a status bar. In other words, a display region originally occupied by the status bar is released, and the released display region may be used to display a display image of a currently running application, to increase an effective display region of the application and improve use experience of the user.

In a possible design method, the processor is configured to determine a display size and a display position of the icon based on a quantity of to-be-displayed icons; and the display screen is configured to display the icon in the target region based on the size and the position that are determined by the processor.

In a possible design method, the processor is configured to determine, based on a quantity of to-be-displayed icons in a status bar, to display the to-be-displayed icon in N rows in the target region, where N≥1; and the display screen is configured to display the to-be-displayed icon in the N rows in the target region.

In a possible design method, the processor is configured to determine a display size and a display position of the icon based on a preset icon priority; and the display screen is configured to display the icon in the target region based on the size and the position that are determined by the processor.

In a possible design method, the input device is configured to detect an expanding operation performed by the user on the status bar; and the display screen is further configured to: move downwards the icon in the status bar to a side that is in the main display region and that is close to the reserved region, to perform display, where the main display region is a region other than the target region in the display screen of the terminal; or continue to display the icon in the status bar in the target region.

In a possible design method, when the terminal is in a portrait mode and is in a full-screen mode, a background color of the target display content is the same as a color of the reserved region, so that the target region and the reserved region are integrated, to avoid a case in which display content of the target region is excessively distinct and consequently display quality of a full-screen application in the main display region is affected, thereby improving viewing experience of the user.

In a possible design method, the display screen is further configured to: when an image color displayed in a preset region of the display screen is the same as the color of the reserved region, use all the target region, the reserved region, and the main display region (the main display region is a region other than the target region on the display screen of the terminal, and the preset region is a region that is in the main display region and that is adjacent to the reserved region) as a display region for display in full screen. In this way, a display area is increased during display in full screen while a display effect is not affected.

In a possible design method, the target display content includes a shortcut icon of at least one application. In this way, the user can quickly switch to a corresponding application by triggering the shortcut in the target region, thereby improving efficiency of switching between applications when the terminal runs a full-screen application.

In a possible design method, when the terminal is in a landscape mode, a background color of the target display content is the same as a color of the reserved region, so that the target region and the reserved region can be visually integrated in the landscape mode, to avoid a case in which display content of the target region is greatly different from that of the reserved region and consequently viewing experience of the user is affected.

In a possible design method, the target display content includes at least one function button of a currently running application, and the function buttons do not affect a related operation performed by the user in the main display region. In addition, when the user requires the function buttons, the user can conveniently and quickly find the function buttons.

In a possible design method, when a screen of the terminal is in a black screen state, the target display content includes a current system time; and when a screen of the terminal is in a lock screen state, the target display content includes: at least one of an unlock prompt for prompting a user to enroll a fingerprint, a to-be-displayed icon in a status bar, a to-be-displayed application icon set by a user, or a new message received by the terminal.

In a possible design method, when the terminal is in a motion state, the target display content includes a preset physiological parameter; and when the terminal is in a vehicle taking state, the target display content includes preset travel information.

In a possible design method, the target region includes a transitional region that is set along the reserved region; and the transitional region is used to be filled with a gradient color from the target region to the reserved region. In this way, the blank reserved region that is visually displayed does not seem excessively distinct, thereby improving viewing experience of the user.

According to a second aspect, an embodiment of this application provides a display method. The method is applied to any one of the foregoing terminals, and the method includes: obtaining, by the terminal, current scenario description data, where the scenario description data is used to indicate a current application scenario of the terminal; and displaying, in the target region, target display content associated with the scenario description data.

In a possible design method, when the scenario description data indicates that the terminal is in a portrait mode and is in a non-full-screen mode, the target display content includes a to-be-displayed icon in a status bar.

In a possible design method, the displaying, in the target region by the terminal, target display content associated with the scenario description data includes: adjusting, in the target region by the terminal, a display size and a display position of the icon based on a quantity of to-be-displayed icons in the status bar.

In a possible design method, the displaying, in the target region by the terminal, target display content associated with the scenario description data includes: displaying, by the terminal, the to-be-displayed icon in N rows in the target region based on a quantity of to-be-displayed icons in the status bar, where N≥1.

In a possible design method, the displaying, in the target region by the terminal, target display content associated with the scenario description data includes: displaying, by the terminal, the to-be-displayed icon of the status bar in the target region based on a preset icon priority.

In a possible design method, after the displaying, in the target region by the terminal, target display content associated with the scenario description data, the method further includes: when detecting an expanding operation performed on the status bar, moving, by the terminal, downwards the icon in the status bar to a side that is in the main display region and that is close to the reserved region, to perform display, where the main display region is a region other than the target region in the display screen of the terminal; or when detecting an expanding operation performed on the status bar, continuing, by the terminal, to display the icon in the status bar in the target region.

In a possible design method, when the scenario description data indicates that the terminal is in a portrait mode and is in a full-screen mode, a background color of the target display content is the same as a color of the reserved region.

In a possible design method, after the displaying, in the target region by the terminal, target display content associated with the scenario description data, the method further includes:

when an image color displayed in a preset region of the display screen is the same as the color of the reserved region, using, by the terminal, all the target region, the reserved region, and the main display region as a display region for display in full screen, where the main display region is a region other than the target region on the display screen of the terminal, and the preset region is a region that is in the main display region and that is adjacent to the reserved region.

In a possible design method, when the scenario description data indicates that the terminal is in a landscape mode, a background color of the target display content is the same as a color of the reserved region.

In a possible design method, the scenario description data further includes description information of a currently running application, and the method further includes: displaying, by the terminal, at least one function button of the currently running application in the target region based on the description information of the currently running application.

In a possible design method, the target region includes a transitional region that is set along the reserved region; and the method further includes: performing, by the terminal, gradient processing on the transitional region in the target region.

According to a third aspect, an embodiment of this application provides a computer-readable storage medium. The computer-readable storage medium stores an instruction, and when the instruction is run on any one of the foregoing terminals, the terminal is enabled to perform any one of the foregoing display methods.

According to a fourth aspect, an embodiment of this application provides a computer program product including an instruction. When the computer program product is run on any one of the foregoing terminals, the terminal is enabled to perform any one of the foregoing display methods.

In the embodiments of this application, a name of the terminal imposes no limitation on the device. In actual implementation, these devices may have other names. Any device whose function is similar to that in the embodiments of this application falls within the scope of claims of this application and equivalent technologies thereof.

In addition, for technical effects of any design manner in the second aspect to the fifth aspect, refer to technical effects of different design methods in the first aspect. Details are not described herein again.

BRIEF DESCRIPTION OF DRAWINGS

FIG. 14(a) and FIG. 14(b) are a schematic diagram 10 of an application scenario of a display method according to an embodiment of the present invention;

FIG. 15 is a schematic diagram 11 of an application scenario of a display method according to an embodiment of the present invention;

FIG. 17(a) and FIG. 17(b) are a schematic diagram 13 of an application scenario of a display method according to an embodiment of the present invention;

FIG. 21(a) and FIG. 21(b) are a schematic diagram 17 of an application scenario of a display method according to an embodiment of the present invention;

FIG. 22(a) and FIG. 22(b) are a schematic diagram 18 of an application scenario of a display method according to an embodiment of the present invention;

FIG. 23(a) and FIG. 23(b) are a schematic diagram 19 of an application scenario of a display method according to an embodiment of the present invention;

DESCRIPTION OF EMBODIMENTS

The following terms "first" and "second" are merely intended for a purpose of description, and shall not be understood as an indication or implication of relative importance or an implicit indication of a quantity of indicated technical features. Therefore, a feature limited by "first" or "second" may explicitly or implicitly include one or more features. In the descriptions of the embodiments of this application, unless otherwise specified, "a plurality of" means two or more than two.

A display method provided in the embodiments of this application may be applied to any terminal having a display function, such as a mobile phone, a terminal, an augmented reality (AR)\virtual reality (VR) device, a tablet computer, a notebook computer, an ultra-mobile personal computer (UMPC), a netbook, or a personal digital assistant (PDA). Certainly, in the following embodiments, no limitation is imposed on a specific form of the terminal.

Figure 1:
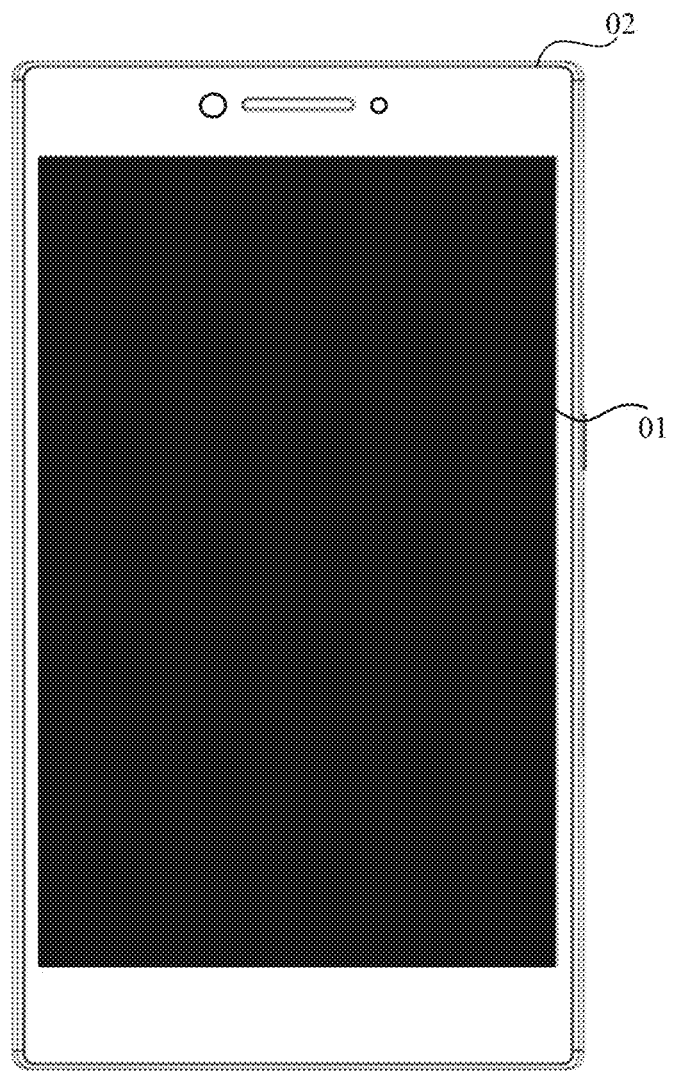
FIG. 1 is a schematic structural diagram of a front panel of a mobile phone according to the prior art.
Figure 2:
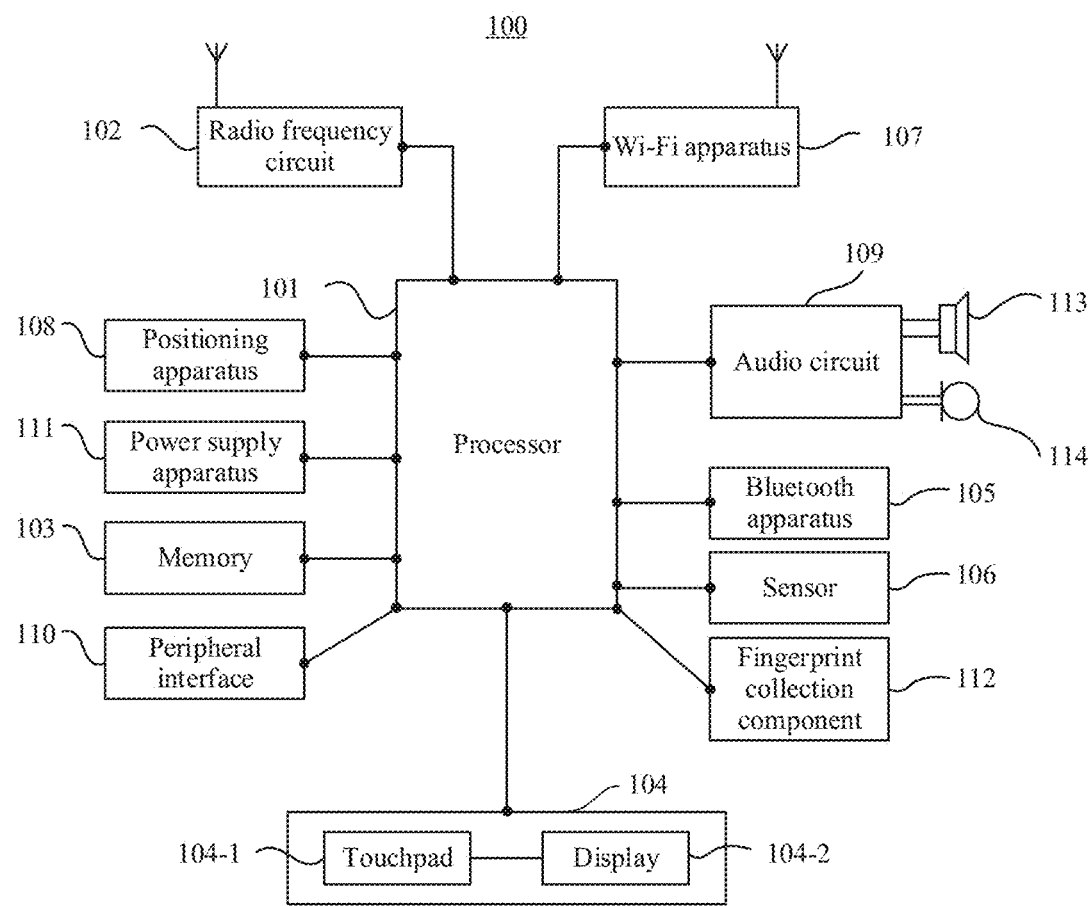
FIG. 2 is a schematic structural diagram 1 of a terminal according to an embodiment of the present invention.

As shown in FIG. 2, the terminal in the embodiments of this application may be a mobile phone 100. The following describes this embodiment in detail by using the mobile phone 100 as an example. It should be understood that the mobile phone 100 shown in the figure is merely an example of the foregoing terminal, and the mobile phone 100 may have more or fewer components than those shown in the figure, or two or more components may be combined, or the mobile phone 100 may have different component configurations.

As shown in FIG. 2, the mobile phone 100 may specifically include components such as a processor 101, a radio frequency (RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply system 111. These components may perform communication by using one or more communications buses or signal cables (not shown in FIG. 2). A person skilled in the art may understand that a hardware structure shown in FIG. 2 does not constitute a limitation on the mobile phone, and the mobile phone 100 may include more or fewer components than those shown in the figure, or may combine some components, or have different component arrangements.

The following describes the components of the mobile phone 100 in detail with reference to FIG. 2.

The processor 101 is a control center of the mobile phone 100, and is connected to all parts of the mobile phone 100 by using various interfaces and lines. By running or executing an application program stored in the memory 103, and invoking data stored in the memory 103, the processor 101 performs various functions of the mobile phone 100 and processes data. In some embodiments, the processor 101 may include one or more processing units. For example, the processor 101 may be a Kirin 960 chip manufactured by Huawei Technologies Co., Ltd. In some embodiments of this application, the processor 101 may further include a fingerprint verification chip, configured to verify a collected fingerprint.

The radio frequency circuit 102 may be configured to receive and send a radio signal in an information receiving and sending process or in a call process. Particularly, after receiving downlink data from a base station, the radio frequency circuit 102 may send the downlink data to the processor 101 for processing; and send related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to a global system for mobile communications, a general packet radio service, code division multiple access, wideband code division multiple access, long term evolution, an email, a short message service, and the like.

The memory 103 is configured to store an application program and data. The processor 101 runs the application program and the data stored in the memory 103, to perform various functions of the mobile phone 100 and process data. The memory 103 mainly includes a program storage region and a data storage region. The program storage region may store an operating system and an application program required by at least one function (such as a sound play function and an image play function). The data storage region may store data (such as audio data and a phone book) created when the mobile phone 100 is used. In addition, the memory 103 may include a high-speed random access memory, or may include a non-volatile memory such as a magnetic disk storage device, a flash memory device, or another volatile solid-state storage device. The memory 103 may store various operating systems such as an iOS® operating system developed by Apple and an Android® operating system developed by Google. The memory 103 may be independent, and is connected to the processor 101 by using the communications bus. Alternatively, the memory 103 may be integrated with the processor 101.

The touchscreen 104 may specifically include a touchpad 104-1 and a display 104-2.

The touchpad 104-1 may collect a touch event (for example, an operation performed by a user on the touchpad 104-1 or near the touchpad 104-1 by using any proper object such as a finger or a stylus) performed by the user of the mobile phone 100 on or near the touchpad 104-1, and send collected touch information to another component (such as the processor 101). The touch event performed by the user near the touchpad 104-1 may be referred to as a floating touch. The floating touch may mean that the user does not need to directly touch the touchpad to select, move, or drag a target (for example, an icon), and the user only needs to be near the terminal to perform a desired function. In an application scenario of the floating touch, terms such as "touch" and "contact" do not implicitly mean to directly touch the touchscreen, but to be near or close to the touchscreen. The touchpad 104-1 on which the floating touch can be performed may be implemented by using a capacitive type, an infrared photoreceptor, an ultrasonic wave, or the like. In addition, the touchpad 104-1 may be implemented in a plurality of types such as a resistive type, a capacitive type, an infrared type, and a surface acoustic wave type.

The display (also referred to as a display screen) 104-2 may be configured to display information input by the user or information provided for the user, and various menus of the mobile phone 100. The display 104-2 can be configured in a form of a liquid crystal display, an organic light emitting diode, or the like. The touchpad 104-1 may cover the display 104-2. When detecting a touch event on or near the touchpad 104-1, the touchpad 104-1 transfers the touch event to the processor 101 to determine a type of the touch event. Then, the processor 101 can provide a corresponding visual output on the display 104-2 based on the type of the touch event. Although the touchpad 104-1 and the display screen 104-2 in FIG. 2 are used as two independent components to implement input and output functions of the mobile phone 100, in some embodiments, the touchpad 104-1 and the display screen 104-2 may be integrated to implement the input and output functions of the mobile phone 100. It may be understood that the touchscreen 104 is formed by stacking layers of materials. In this embodiment of this application, only the touchpad (layer) and the display screen (layer) are displayed, and another layer is not recorded in this embodiment of this application. In addition, in some other embodiments of this application, the touchpad 104-1 may cover the display 104-2, and a size of the touchpad 104-1 is greater than a size of the display screen 104-2, so that the display screen 104-2 is entirely covered by the touchpad 104-1. Alternatively, the touchpad 104-1 may cover a front face of the mobile phone 100 in a form of a complete rectangular screen, in other words, any touch performed by the user on the front face of the mobile phone 100 can be sensed by the mobile phone. In this way, full touch experience on the front face of the mobile phone can be implemented. In some other embodiments, the display screen 104-2 may alternatively cover the front surface of the mobile phone 100 in a form of a complete rectangular screen. In this way, a bezel-less structure can be implemented on the front surface of the mobile phone.

In this embodiment of this application, to increase a screen-to-body ratio of the terminal, an existing front panel layout of the terminal is still used. For example, a front panel component such as a front camera or an earpiece is disposed on a top of a front panel of the terminal, as shown in FIG. 3, in this embodiment of this application, the touchscreen 104 (or the display 104-2) disposed on the front panel of the mobile phone 100 may be a touchscreen 104 with an irregular shape. In this case, the touchscreen 104 with an irregular shape may be divided into a regular rectangle display region (which may be referred to as a main display region in a subsequent embodiment) and a remaining irregular display region (which may be referred to as a target region in a subsequent embodiment).

Figure 3A:
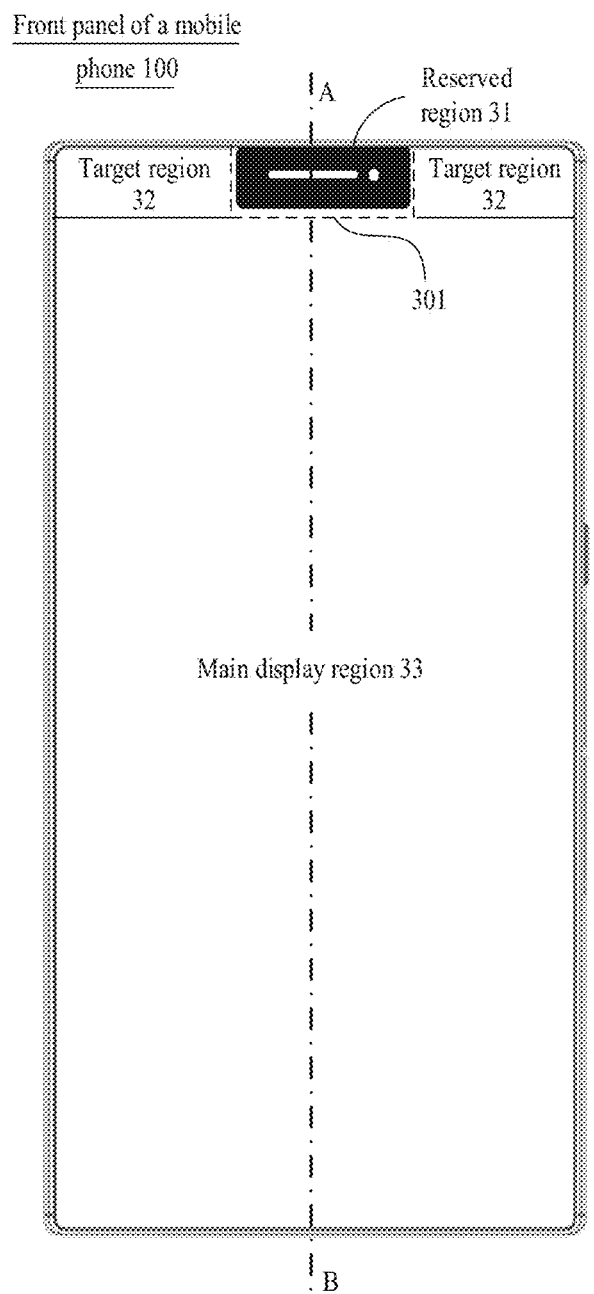
FIG. 3A is a schematic structural diagram 1 of a front panel of a terminal according to an embodiment of the present invention.

In a possible design method, as shown in FIG. 3A, a rectangular touchscreen 104 may be blanked along a dashed line 301. In this way, a blanked part may be provided with an existing front panel component such as a camera, an earpiece, or a fingerprint sensor on the front face of the mobile phone 100, and an original layout and function of the front face of the mobile phone 100 are not affected. In a subsequent embodiment, the blanked part is referred to as a reserved region 31. In this case, the touchscreen 104 may be divided into a target region 32 and a main display region 33. The main display region 33 is a complete rectangle on the touchscreen 104. For example, the main display region 33 is a complete rectangle with a largest area on the touchscreen 104. Therefore, compared with a conventional layout of the touchscreen 104, this irregular layout mode of the touchscreen 104 may further increase an area of the touchscreen 104 on the entire mobile phone 100, thereby increasing an area of the display region.

In another possible design method, a mold matching the touchscreen 104 with an irregular shape may also be used, and the shape of the touchscreen 104 shown in FIG. 3A is directly formed when the touchscreen is manufactured.

Figure 3B:
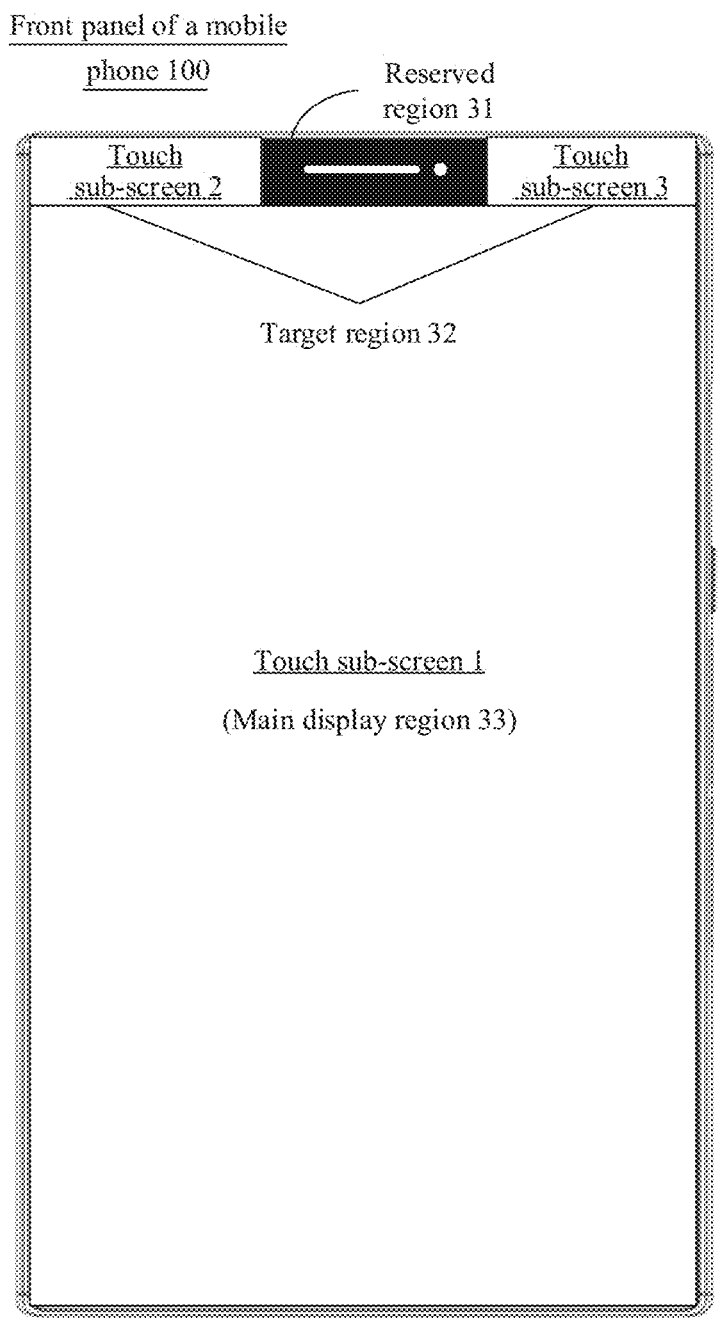
FIG. 3B is a schematic structural diagram 2 of a front panel of a terminal according to an embodiment of the present invention.

In another possible design method, a plurality of touchscreens may be further spliced into the touchscreen 104. For example, as shown in FIG. 3B, the touchscreen 104 includes three touch subscreens. A shape and a layout location of a touch subscreen 1 are the same as those of a conventional touchscreen, that is, the touch subscreen 1 is a regular rectangle disposed at a center. The touch subscreen 1 may be used as the main display region 33 of the mobile phone 100, a touch subscreen 2 and a touch subscreen 3 are respectively located on two sides of an earpiece and a front camera, and shapes of the touch subscreen 2 and the touch sub screen 3 may not be rectangular, for example, may be triangular or circular, and may be used as an auxiliary display region (that is, the target region 32) of the mobile phone 100. In this case, a remaining region of the front panel of the mobile phone 100 is the reserved region 31, and may be used to dispose an original component such as a camera, an earpiece, or a fingerprint sensor. This is not limited in this embodiment of the present invention.

In either of the foregoing design methods, because the touchscreen 104 is not disposed in the reserved region 31, the mobile phone 100 cannot implement a display function in the reserved region 31. The target region 32 with an irregular shape is provided with the touchscreen 104. Therefore, the terminal can display corresponding display content in the target region 32, thereby increasing an area of an effective display region on the mobile phone 100.

Figure 3C:
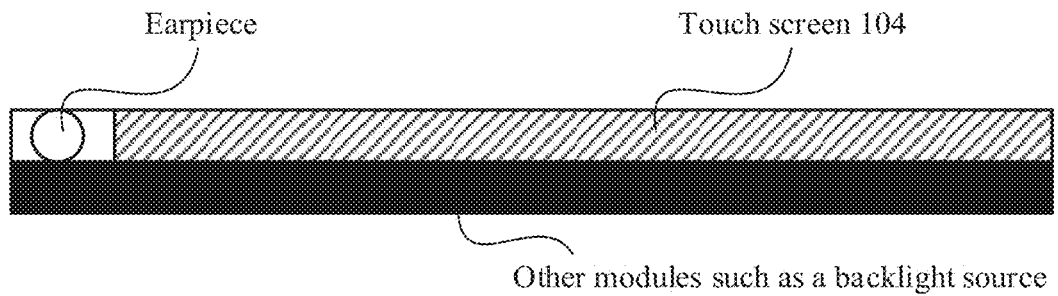
FIG. 3C is a schematic sectional view of a front panel of a terminal according to an embodiment of the present invention.

In addition, as shown in FIG. 3C, FIG. 3C is schematic sectional view of the mobile phone 100 along a line AB in FIG. 3A. Because the touchscreen 104 is not disposed in the reserved region 31, components such as the touchscreen 104 of the mobile phone 100 and an earpiece on the front panel may be disposed on another module of the mobile phone 100 on a same layer. In this way, a thickness of the mobile phone 100 can be reduced. That is, a hardware layout structure of the mobile phone 100 provided in this embodiment of this application does not affect a layout of a front panel of the mobile phone 100 and a thickness of the mobile phone 100 while increasing an area of an effective display region on the mobile phone 100.

Figure 4:
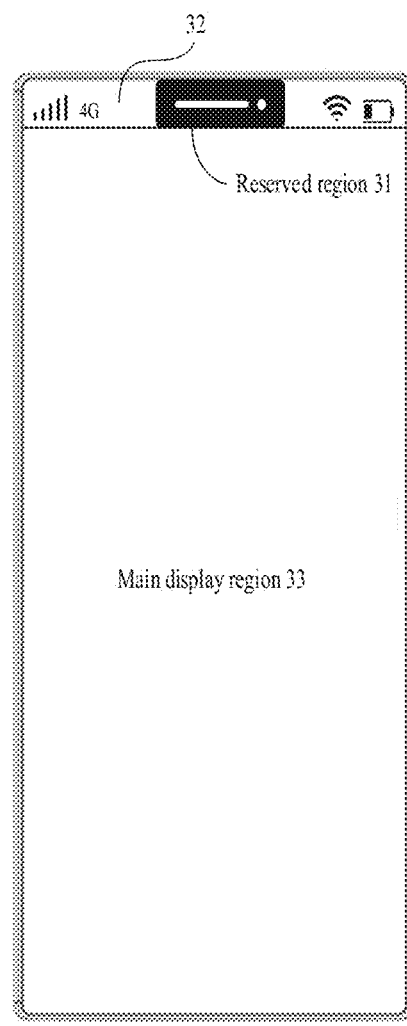
FIG. 4 is a schematic diagram 1 of an application scenario of a display method according to an embodiment of the present invention.

For example, as shown in FIG. 4, a corresponding icon in a status bar (status bar) of the mobile phone, such as an icon of a battery level, an icon of signal strength, and an icon of a Wi-Fi signal, may be displayed in the target region 32. In this way, the status bar originally displayed under the reserved region 31 is moved to two sides of the reserved region 31, a display region originally occupied by the status bar is released, and the released display region may be used to display a display image of a currently running application, to increase an effective display region of the application and improve use experience of the user.

Figures 5A, 5B:
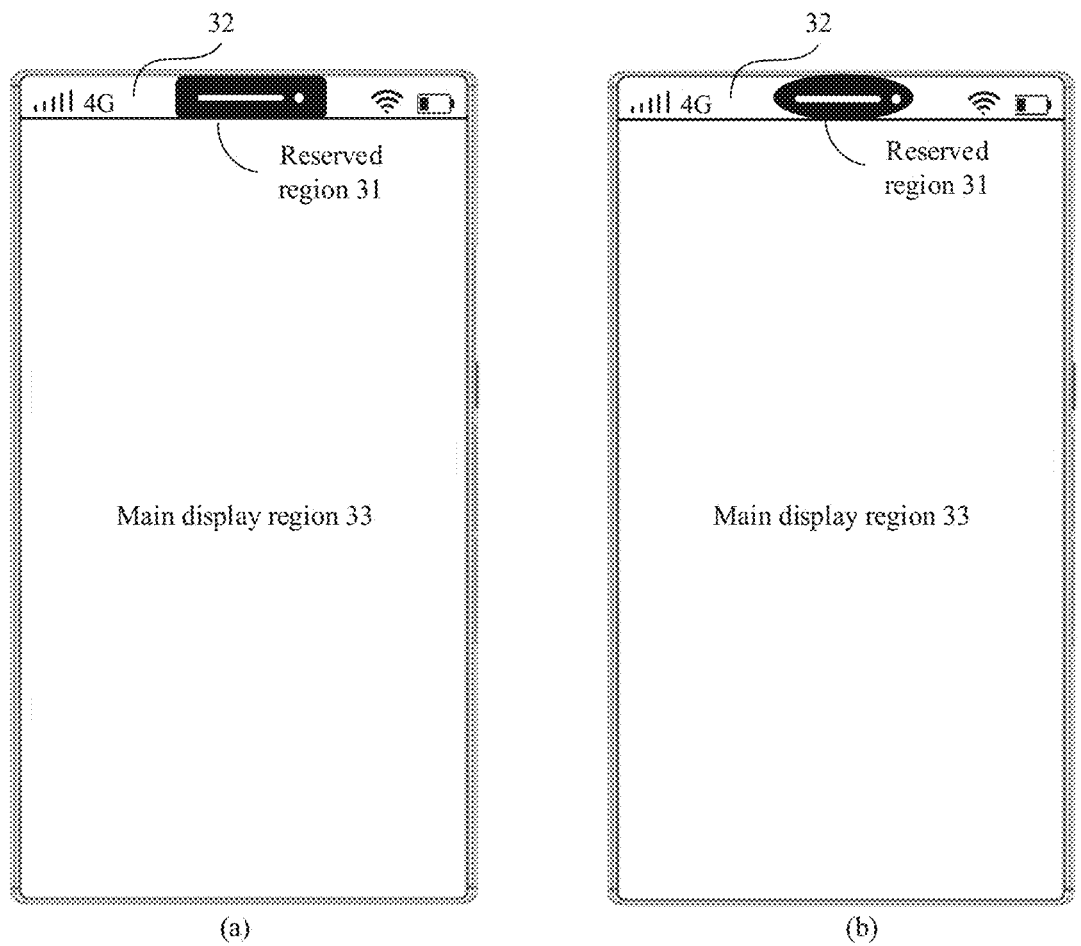
FIG. 5(a) and FIG. 5(b) are a schematic diagram 2 of an application scenario of a display method according to an embodiment of the present invention.

It should be noted that, as shown in FIG. 5(a) and FIG. 5(b), a shape of the blanked reserved region 31 may be any shape such as a circle, an ellipse (as shown in FIG. 5(b)), a right-angled rectangle, or a rounded rectangle (as shown in FIG. 5(a)). This is not limited in any way in this embodiment of this application.

In this embodiment of this application, the mobile phone 100 may further have a fingerprint recognition function. For example, a fingerprint recognizer 112 may be configured on a back face of the mobile phone 100 (for example, a lower part of a rear camera), or a fingerprint recognizer 112 may be configured on the front face of the mobile phone 100 (for example, a lower part of the touchscreen 104). For another example, a fingerprint collection device 112 may be configured in the touchscreen 104, to implement a fingerprint recognition function. In other words, the fingerprint collection device 112 may be integrated with the touchscreen 104 to implement the fingerprint recognition function of the mobile phone 100. In this case, the fingerprint collection device 112 is configured in the touchscreen 104 to serve as a part of the touchscreen 104, or may be configured in the touchscreen 104 in another manner. A main component of the fingerprint collection device 112 in this embodiment of this application is a fingerprint sensor. The fingerprint sensor may use any type of sensing technology, including but not limited to an optical sensing technology, a capacitive sensing technology, a piezoelectric sensing technology, an ultrasonic sensing technology, and the like.

The mobile phone 100 may further include the Bluetooth apparatus 105, configured to implement data exchange between the mobile phone 100 and another terminal (such as a mobile phone or a smartwatch) over a short distance. In this embodiment of this application, the Bluetooth apparatus may be an integrated circuit, a Bluetooth chip, or the like.

The mobile phone 100 may further include at least one sensor 106 such as a light sensor, a motion sensor, and another sensor. Specifically, the optical sensor may include an ambient light sensor and a proximity sensor. The ambient light sensor may adjust luminance of the display of the touchscreen 104 based on brightness of ambient light. The proximity sensor may turn off the display when the mobile phone 300 approaches to ears. As one type of the motion sensor, an accelerometer sensor may detect values of acceleration in all directions (usually, three axes), may detect a value and a direction of gravity when the accelerometer sensor is stationary, and may be used in an application for identifying a mobile phone posture (such as screen switching between a landscape mode and a portrait mode, a related game, or magnetometer posture calibration), a function related to vibration identification (such as a pedometer or a knock), and the like. Another sensor such as a gyroscope, a barometer, a hygrometer, a thermometer, or an infrared sensor may be further configured in the mobile phone 100. Details are not described herein again.

The Wi-Fi apparatus 107 is configured to provide, for the mobile phone 100, network access that complies with a Wi-Fi related standard protocol. The mobile phone 100 may access a Wi-Fi access point by using the Wi-Fi apparatus 107, to help the user receive and send an email, browse a web page, access streaming media, and the like. The Wi-Fi apparatus 107 provides wireless broadband Internet access for the user. In some other embodiments, the Wi-Fi apparatus 107 may be used as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as a global positioning system (GPS), a BeiDou Navigation Satellite System, or a GLONASS of Russia. After receiving a geographic location sent by the positioning system, the positioning apparatus 108 sends the information to the processor 101 for processing, or sends the information to the memory 103 for storage. In some other embodiments, the positioning apparatus 108 may further be a receiver of an assisted global positioning system (AGPS). The AGPS system serves as an assisted server to assist the positioning apparatus 108 in completing ranging and positioning services. In this case, the assisted positioning server communicates, through a wireless communications network, with the positioning apparatus 108 (namely, a GPS receiver) of the terminal such as the mobile phone 100 and provides positioning assistance. In some other embodiments, the positioning apparatus 108 may further be a positioning technology based on a Wi-Fi access point. Each Wi-Fi access point has a globally unique MAC address, and the terminal can scan and collect a broadcast signal of a surrounding Wi-Fi access point when Wi-Fi is enabled. Therefore, the terminal can obtain a MAC address broadcasted by the Wi-Fi access point. The terminal sends, to a location server through a wireless communications network, such data (for example, the MAC address) that can identify the Wi-Fi access point. The location server retrieves a geographic location of each Wi-Fi access point, calculates a geographic location of the terminal with reference to strength of the Wi-Fi broadcast signal, and sends the geographic location of the terminal to the positioning apparatus 108 of the terminal.

The audio circuit 109, a speaker 113, and a microphone 114 may provide an audio interface between the user and the mobile phone 100. The audio circuit 109 may transmit, to the speaker 113, an electrical signal converted from received audio data, and the speaker 113 converts the electrical signal into a sound signal for outputting. In addition, the microphone 114 converts a collected sound signal into an electrical signal, and the audio circuit 109 converts the electrical signal into audio data after receiving the electrical signal, and then outputs the audio data to the RF circuit 102 to send the audio data to, for example, another mobile phone, or outputs the audio data to the memory 103 for further processing.

The peripheral interface 110 is configured to provide various interfaces for an external input/output device (such as a keyboard, a mouse, an external display, an external memory, and a subscriber identification module card). For example, the mobile phone is connected to the mouse by using a universal serial bus (USB) interface, and the mobile phone is connected, by using a metal contact on a card slot of the subscriber identification module card, to the subscriber identification module (SIM) card provided by a telecommunications operator. The peripheral interface 110 may be configured to couple the external input/output peripheral device to the processor 101 and the memory 103.

The mobile phone 100 may further include a power supply apparatus 111 (for example, a battery and a power management chip) that supplies power to each component. The battery may be logically connected to the processor 101 by using the power management chip, so that functions such as charging management, discharging management, and power consumption management are implemented by using the power supply apparatus 111.

Although not shown in FIG. 2, the mobile phone 100 may further include a camera (a front camera and/or a rear camera), a flash, a micro projection apparatus, a near field communication (NFC) apparatus, and the like. Details are not described herein again.

Figure 6:
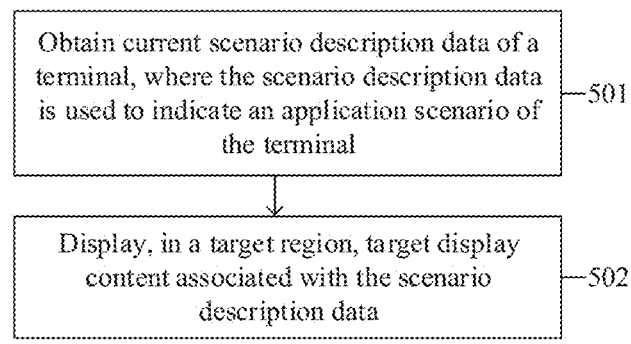
FIG. 6 is a schematic flowchart of a display method according to an embodiment of the present invention.

A display method provided in an embodiment of this application is described below in detail with reference to specific embodiments. As shown in FIG. 6, the method includes the following steps.

501: Obtain current scenario description data of a terminal, where the scenario description data is used to indicate an application scenario of the terminal.

The application scenario may be specifically a current landscape or portrait mode of the terminal, or may be a full-screen or non-full-screen mode of an application currently run on the terminal, or may be information such as a type of an application (for example, a game application or an instant messaging application) currently run on the terminal, a current screen status (for example, a lock screen state or a black screen state) of the terminal, a current motion state (for example, a hand raising scenario or a running scenario) of the terminal, or the like that is used to reflect a running status of the terminal. This is not limited in this embodiment of this application.

Using an Android operating system as an example, the terminal may monitor a current landscape or portrait mode of the terminal by using a window manager service (Window Manager Service) in the Android operating system, or may monitor a full-screen or non-full-screen mode of a currently running application by using the window manager service.

Figure 7:
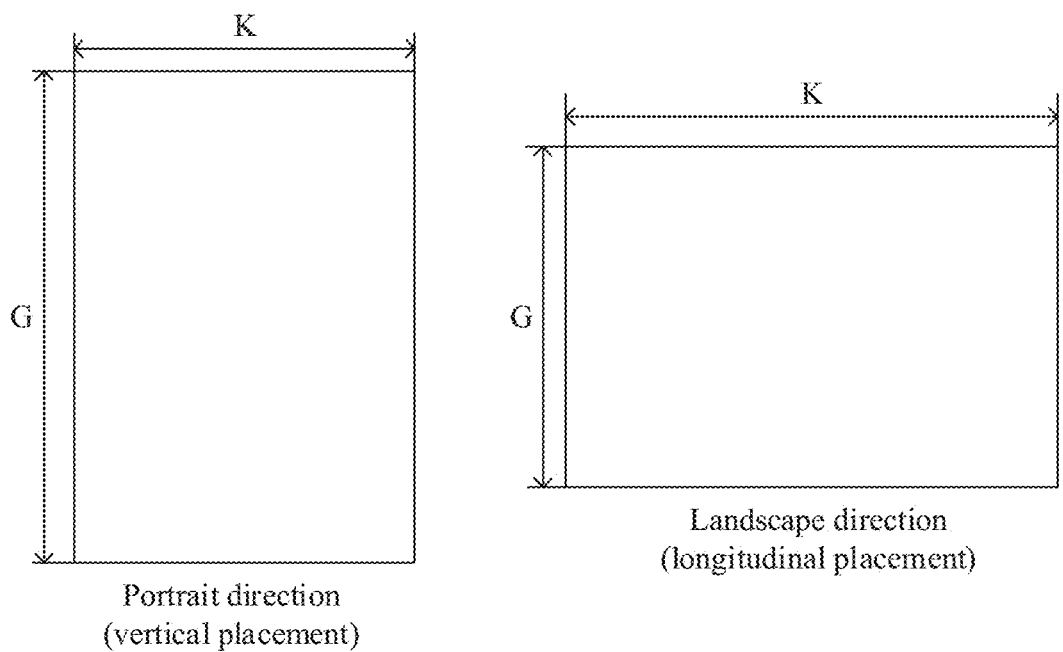
FIG. 7 is a schematic diagram 3 of an application scenario of a display method according to an embodiment of the present invention.

Currently, the terminal usually has two placement directions: a landscape direction and a portrait direction. The terminal may detect, by using a sensor, whether the terminal is currently in the landscape direction or the portrait direction. As shown in FIG. 7, in the portrait direction, a height G of the terminal is greater than a width K, but in the landscape direction, the height G of the terminal is less than the width K. In this embodiment of the present invention, when the terminal is run in the landscape direction, the terminal may be referred to as being in a landscape mode, and when the terminal is run in the portrait direction, the terminal may be referred to as being in a portrait mode.

In addition, in the embodiment of the present invention, when the terminal runs an application, if a display image of the application completely covers an entire display screen of the terminal, the terminal is in a full-screen mode at this time. Correspondingly, if the display image of the application cannot completely cover the entire display screen of the terminal, the terminal is in a non-full-screen mode at this time.

502: Display, in a target region, target display content associated with the scenario description data.

Referring to FIG. 3 or FIG. 4, the target region is a region that is other than the reserved region 31 in a top region of the touchscreen of the terminal and on which the touchscreen 104 (or the display screen) is disposed.

Figure 8A:
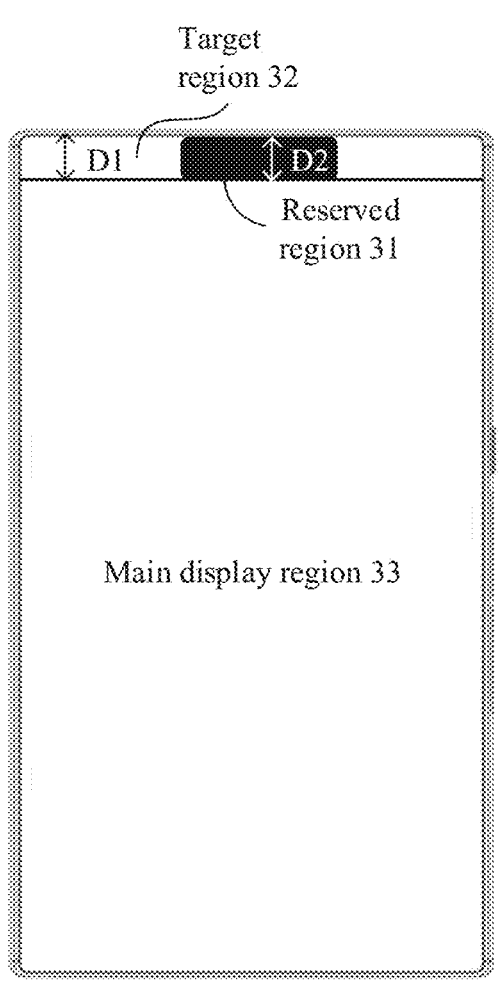
FIG. 8(a) and FIG. 8(b) are a schematic diagram 4 of an application scenario of a display method according to an embodiment of the present invention.
Figure 8B:
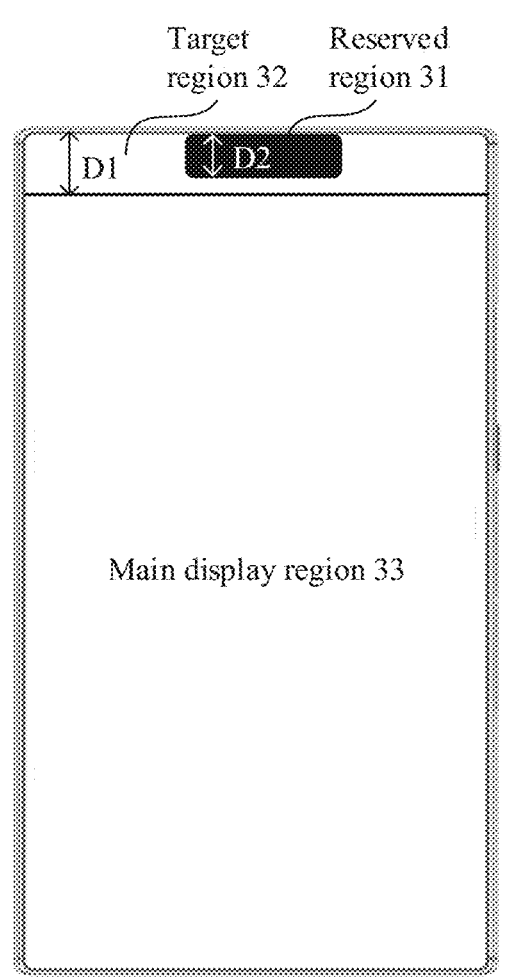

For example, as shown in FIG. 8(a), a length D1 of the target region 32 in a direction of a rectangular coordinate system y may be equal to a length D2 of the reserved region 31 in the direction of the rectangular coordinate system y. Alternatively, as shown in FIG. 8(b), the length D1 of the target region 32 in the direction of the rectangular coordinate system y may be greater than the length D2 of the reserved region 31 in the direction of the rectangular coordinate system y.

That is, D1≥D2≥0. In this way, the length of the reserved region 31 in the direction of the rectangular coordinate system y does not exceed the length of the target region 32 in the direction of the rectangular coordinate system y. Therefore, it can be ensured that the main display region 33 of the terminal is a complete rectangle, there is no gap in the main display region 33, and an image displayed in the main display region 33 is not damaged by the blanked reserved region 31.

In a possible design method, when the scenario description data obtained in step 501 indicates that the terminal is currently in a portrait mode and in a non-full-screen display mode, the terminal may display a corresponding icon in a status bar in the target region 32.

Figure 9:
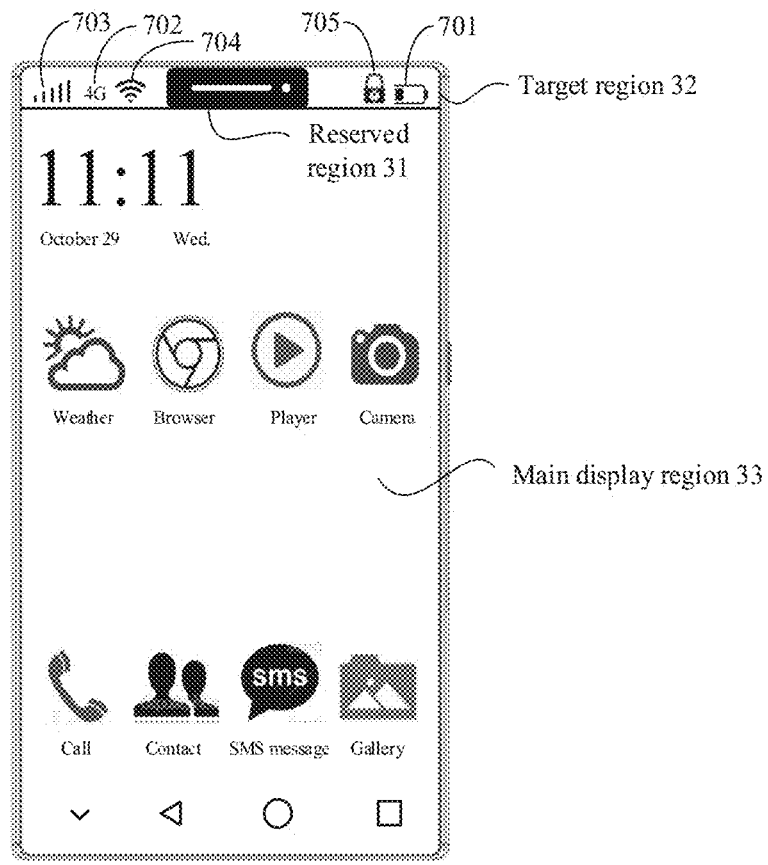
FIG. 9 is a schematic diagram 5 of an application scenario of a display method according to an embodiment of the present invention.

The icon in the status bar specifically includes a fixed icon and a dynamic icon. As shown in FIG. 9, the fixed icon is an icon that always exists in the status bar, for example, a battery level icon 701, a network type icon 702, or a signal strength icon 703. The dynamic icon is an icon that is generated through triggering in a particular scenario, for example, a Wi-Fi icon 704 generated after the terminal accesses a Wi-Fi network, or a portrait locking icon 705 generated when a user taps a portrait locking button.

In a conventional process of displaying the status bar, because the status bar is generally in a complete shape of a rectangular strip, to-be-displayed icons in the status bar may be sequentially arranged in the rectangular strip for display.

However, in this embodiment of this application, because the target region 32 includes the reserved region 31 having no display function, when the icon in the status bar is displayed in the target region 32, the reserved region 31 needs to be avoided. Otherwise, a gap may appear in the displayed status bar, that is, the displayed status bar is incomplete.

Figure 10:
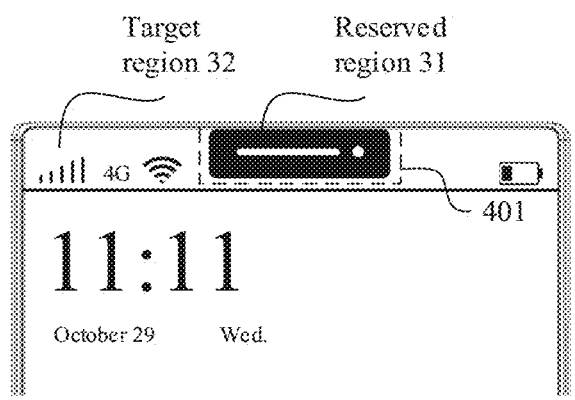
FIG. 10 is a schematic diagram 6 of an application scenario of a display method according to an embodiment of the present invention.

Specifically, as shown in FIG. 10, a display boundary line 401 may be provided in the target region 32 along a boundary of the reserved region 31. The display boundary line 401 may be formed by a series of coordinate points, and these coordinate points may be provided in the terminal in advance. In this case, when the terminal is currently in the portrait mode and in the non-full-screen display mode, the terminal may display a fixed icon and a dynamic icon in the status bar in a region that is beyond the display boundary line 401 in the target region 32 and that is away from the reserved region 31. Certainly, the display boundary line 401 may be displayed or not displayed in the target region 32, and this is not limited in the embodiment of the present invention.

Figure 11A:
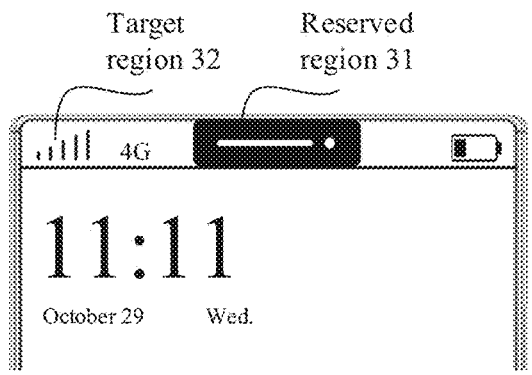
FIG. 11(a) and FIG. 11(b) are a schematic diagram 7 of an application scenario of a display method according to an embodiment of the present invention.
Figure 11B:
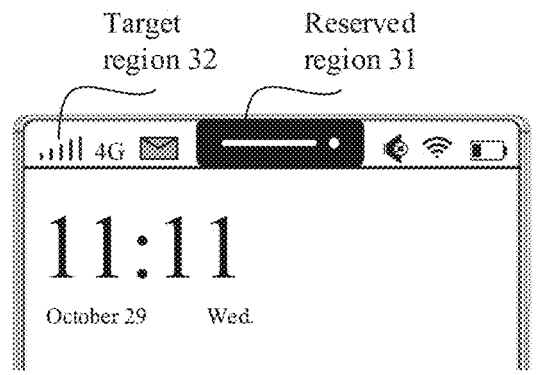

In some embodiments, the terminal may adjust a size of each to-be-displayed icon and a distance between icons based on a quantity of to-be-displayed icons in the status bar. For example, when four icons in the status bar are displayed in the target region 32, as shown in FIG. 11(*a*), a size of each icon is relatively large, and a distance between the icons may also be set to be relatively large. However, when six icons in the status bars are displayed in the target region 32, as shown in FIG. 11(*b*), a size of each icon may be adjusted to be relatively small, and a distance between icons may also be set to be relatively small.

Figure 12A:
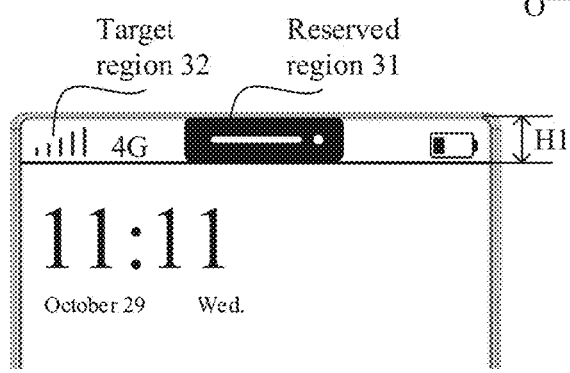
FIG. 12(a) and FIG. 12(b) are a schematic diagram 8 of an application scenario of a display method according to an embodiment of the present invention.
Figure 12B:
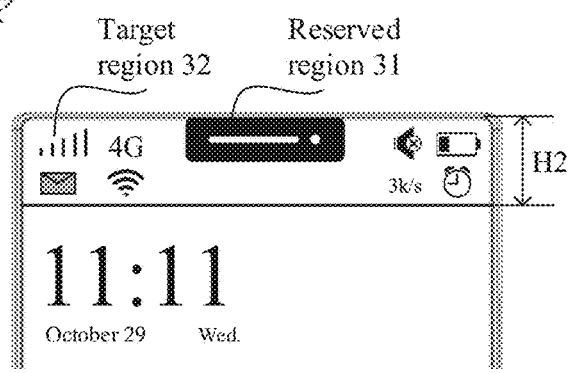

In some embodiments, the terminal may further adjust a length of the entire target region 32 in a y direction based on the quantity of to-be-displayed icons in the status bar, so that the to-be-displayed icons in the status bar may be displayed in the target region 32 in a one-row or multi-row layout form. For example, when there are four to-be-displayed icons, as shown in FIG. 12(*a*), the length of the target region 32 in the y direction may be set to H1. In this case, the terminal can display the four icons in one row. When there are eight to-be-displayed icons, as shown in FIG. 12(*b*), the length of the target region 32 in the y direction may be set to H2 (H2>H1, for example, H2=2H1). In this case, the terminal may display the eight icons in two rows.

In some embodiments, the terminal may further determine a layout manner of the icon in the target region 32 based on a priority of the to-be-displayed icon in the status bar. A display position and a display size of a to-be-displayed icon having a relatively high priority are generally fixed, so that the user clearly sees a terminal state displayed by the icon. A display position and a display size of a to-be-displayed icon having a relatively low priority may be generally dynamically adjusted by the terminal.

Figure 13:
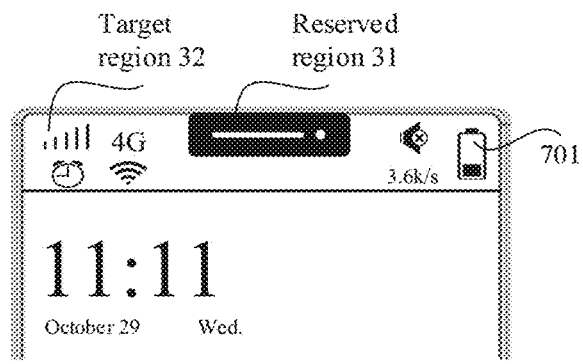
FIG. 13 is a schematic diagram 9 of an application scenario of a display method according to an embodiment of the present invention.

For example, because an electricity level of the terminal directly affects whether the terminal can be used currently, and the user cares about the electricity level of the terminal, a priority of the electricity level icon 701 may be preset to be higher than that of another icon. That is, when the electricity level icon 701 is displayed in the status bar, a size and a position of the electricity level icon 701 are fixed. For example, as shown in FIG. 13, the electricity level icon 701 is fixedly displayed in a first position on the right side of the status bar, and has a height that is equal to that of the status bar. Therefore, when the icon in the status bar is displayed in the target region 32, the terminal may preferentially display the electricity level icon 701 in the first position on the right side of the target region 32, and a display position and a display size of the another icon may be dynamically set based on a quantity of icons or an area of the target region 32, and this is not limited in any way in this embodiment of this application.

Certainly, some templates for displaying the icon in the status bar in the target region 32 may be preset in the terminal. For example, as shown in FIG. 14(*a*), when the quantity of to-be-displayed icons is less than or equal to 6, a display template corresponding to the quantity may be set as a display template 1. When the quantity of to-be-displayed icons is greater than 6 and is less than or equal to 10, a display template corresponding to the quantity may be set as a display template 2. In this way, when the icon in the status bar needs to be displayed in the target region 32, the terminal may invoke a corresponding template based on the quantity of to-be-displayed icons, to arrange and display the icons, for example, sequentially display the to-be-displayed icons in specified positions of the display template in an order of from left to right and from top to bottom.

Optionally, when the icon in the status bar is displayed in the target region 32, a background color of the target region 32 may be set as a color the same as that of the reserved region 31. For example, as shown in FIG. 15, the reserved region 31 is black. Therefore, the background color of the target region 32 may also be set as black, so that the target region 32 and the reserved region 31 can be visually integrated, to avoid a case in which display content of the target region 32 is excessively distinct and consequently viewing experience of the user is affected.

As can be seen from the foregoing embodiment, when the terminal is currently in the portrait mode and in the non-full-screen display mode, the terminal may move the status bar originally displayed below the reserved region 31 upwards to the target region 32 for display, to increase a display area of an application or a desktop that is run in the main display region 33, and increase an effective display area of the terminal without modifying an original layout of components such as a front camera.

Further, the status bar generally includes two states: expanded and closed. The closed state refers to that the status bar is displayed at a fixed position (as shown in FIG. 3 to FIG. 15) on the display interface. In the closed state, the user generally cannot operate an icon in the status bar. The expanded state refers to that the status bar is completely displayed on the entire display interface through an operation such as dropping down or tapping by the user, and is usually displayed in a form of a page or a window card. In the expanded state, the user may directly operate a corresponding icon to control a related function of the terminal, for example, enable Bluetooth and disable a data function.

Figure 16A:
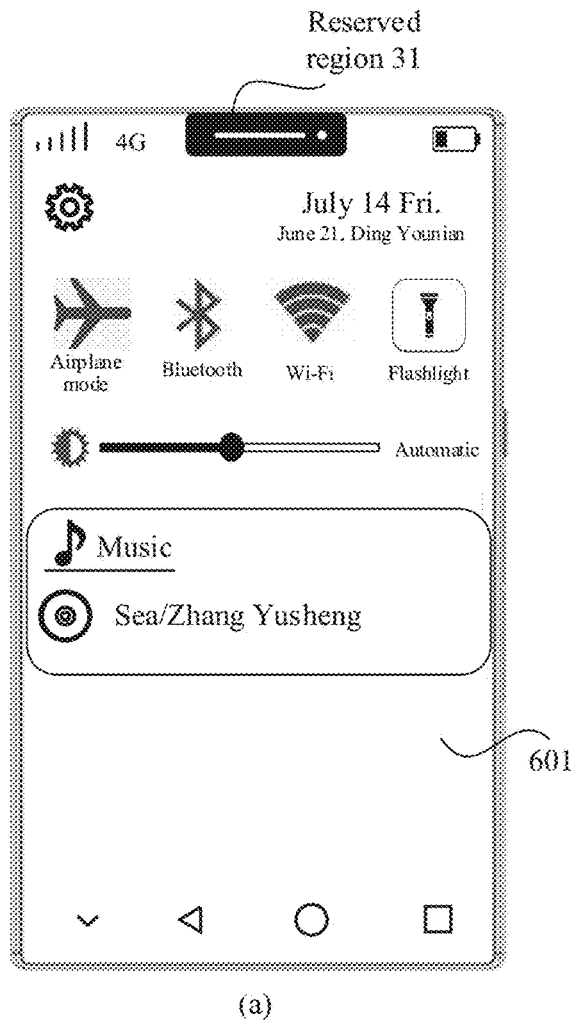
FIG. 16(a) and FIG. 16(b) are a schematic diagram 12 of an application scenario of a display method according to an embodiment of the present invention.
Figure 16B:

Therefore, when detecting that the user performs an expanding operation (for example, a tap operation or a drop-down operation) on the status bar displayed in the target region 32, the terminal may display a complete status bar page 601 on a current display interface in a form of a page or a window card. Different from the prior art, as shown in FIG. 16(a), the terminal may continue to display a related icon in the status bar in the target region 32. Alternatively, as shown in FIG. 16(b), the terminal may move the entire status bar downwards to a side that is in the main display region 33 and that is close to the reserved region 31. This is not limited in this embodiment of this application.

In another possible design method, when the scenario description data obtained in step 501 indicates that the terminal is currently in a portrait mode and in a full-screen display mode, the terminal may display, in the target region 32, an image whose color is the same as that of the reserved region 31. That is, when the terminal displays a full-screen application in the portrait mode, to ensure integrity of a displayed image, as shown in FIG. 17(a), the main display region 33 may be used as a display region to display the currently running full-screen application. The target region 32 may display an image having a same color as that of the reserved region 31. For example, still as shown in FIG. 17(a), the reserved region 31 is black. In this case, the target region 32 of the terminal may also be filled with black, so that the target region 32 and the reserved region 31 are integrated, to avoid a case in which display content of the target region 32 is excessively distinct and consequently display quality of a full-screen application in the main display region 33 is affected, and to improve viewing experience of the user.

Alternatively, when the terminal displays a full-screen application in the portrait mode, as shown in FIG. 17(b), the terminal may further display, in the target region 32, a shortcut (for example, an application icon) of one or more applications that is recently used by the user, a shortcut of one or more applications that is used relatively frequently, or a shortcut of one or more applications that is preset by the user. In this way, the user can quickly switch to a corresponding application by triggering the shortcut in the target region 32, thereby improving efficiency of switching between applications when the terminal runs a full-screen application.

Further, the scenario description data obtained in step 501 may further include information about an image displayed when a current full-screen application is run. In this case, if a color of an image displayed in a preset region below the reserved region 31 in the displayed image is the same as the color of the reserved region 31, the terminal may use both the target region 32 and the main display region 33 as the display region to display the currently running full-screen application.

Figures 18A, 18B:
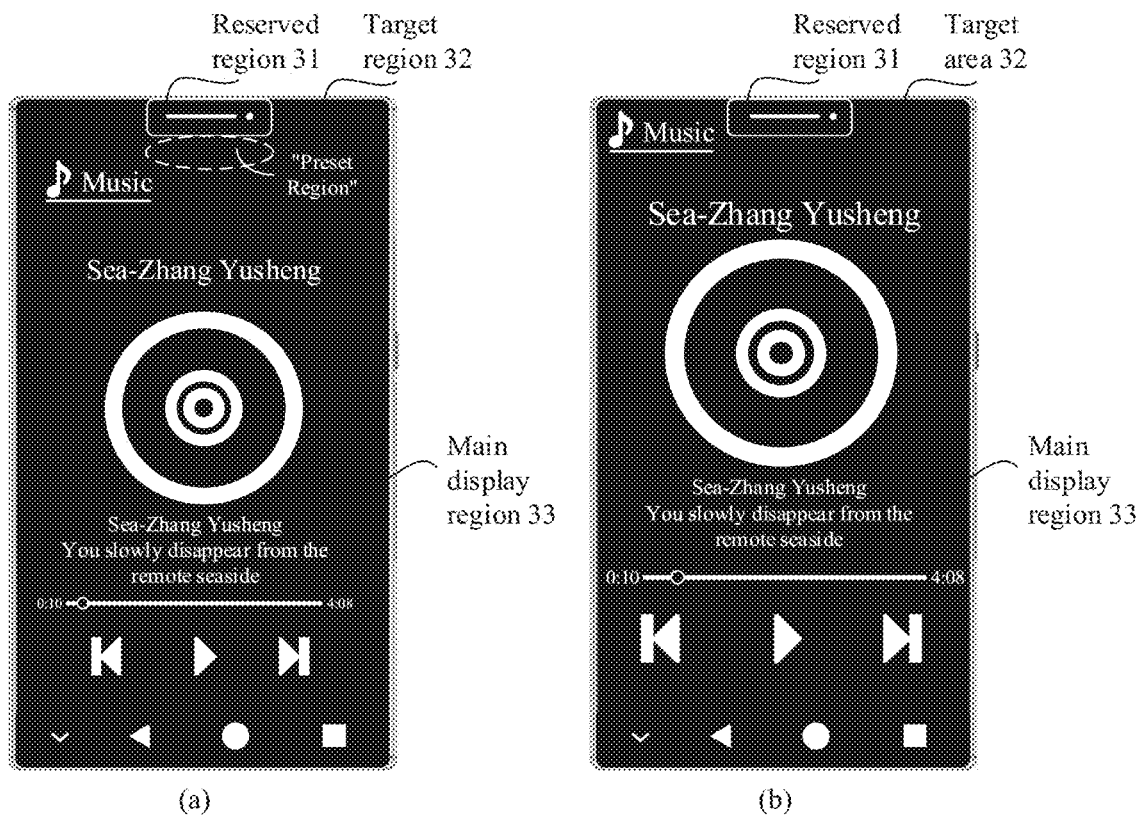
FIG. 18(a) and FIG. 18(b) are a schematic diagram 14 of an application scenario of a display method according to an embodiment of the present invention.

For example, as shown in FIG. 18(a), when the terminal displays a full-screen application in the main display region 33, a preset region that is in the main display region 33 and that is adjacent to the reserved region 31 is black, and the reserved region 31 is also black. In this case, as shown in FIG. 18(b), the terminal may use, as the display region, a rectangular region obtained by combining the entire reserved region 31, the target region 32, and the main display region 33, to display the full-screen application. In this case, although the reserved region 31 has no display function, the black color of the reserved region 31 may also be used as a part of a displayed image of the full-screen application, so that the user can visually obtain a larger effective display region, thereby improving viewing experience of the user.

Figure 19:
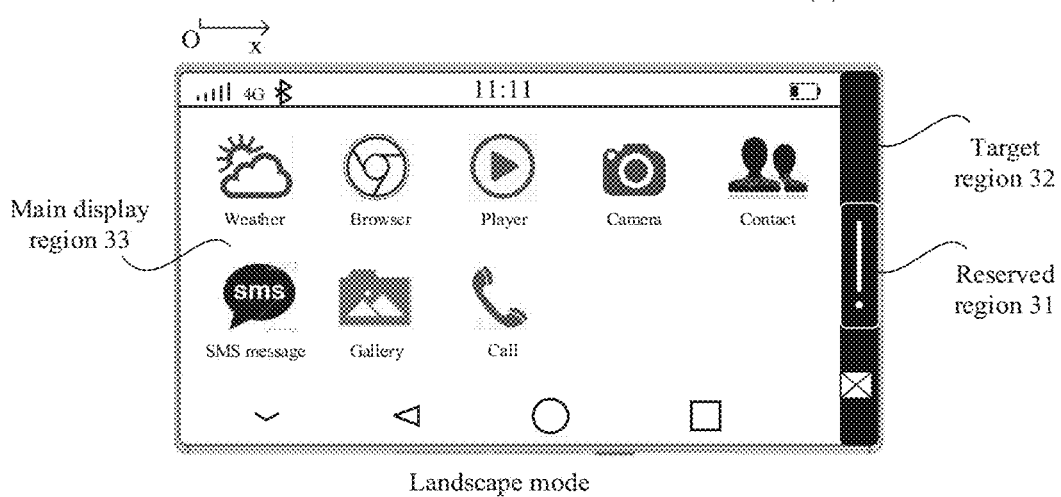
FIG. 19 is a schematic diagram 15 of an application scenario of a display method according to an embodiment of the present invention.

In another possible design method, when the scenario description data obtained in step 501 indicates that the terminal is currently in the landscape mode, as shown in FIG. 19, regardless of whether the terminal currently runs a full-screen application or a non-full-screen application, because the status bar has been adjusted to a direction along a long edge of the terminal (that is, a direction of an x axis in FIG. 19) at this time, the terminal may display, in the target region 32, an image whose color is the same as that of the reserved region 31. In this way, the target region 32 and the reserved region 31 can be visually integrated, and this avoids that display content of the target region 32 is greatly different from that of the reserved region 31 and consequently viewing experience of the user is affected.

Certainly, if the reserved region 31 is black and the target region 32 is also black when not displayed, it may be set that the reserved region 31 does not display any display content at this time, so that the display content presented in the target region 32 has a same color as that of the reserved region 31, and power consumption of the terminal may be reduced.

Alternatively, the scenario description data obtained in step 501 may further include description information of the currently running application, for example, a package name of the application or a type of the application. In this case, the terminal may further display an icon such as a setting button of the currently running application in the target region 32 based on specific information of the application.

Figure 20A:
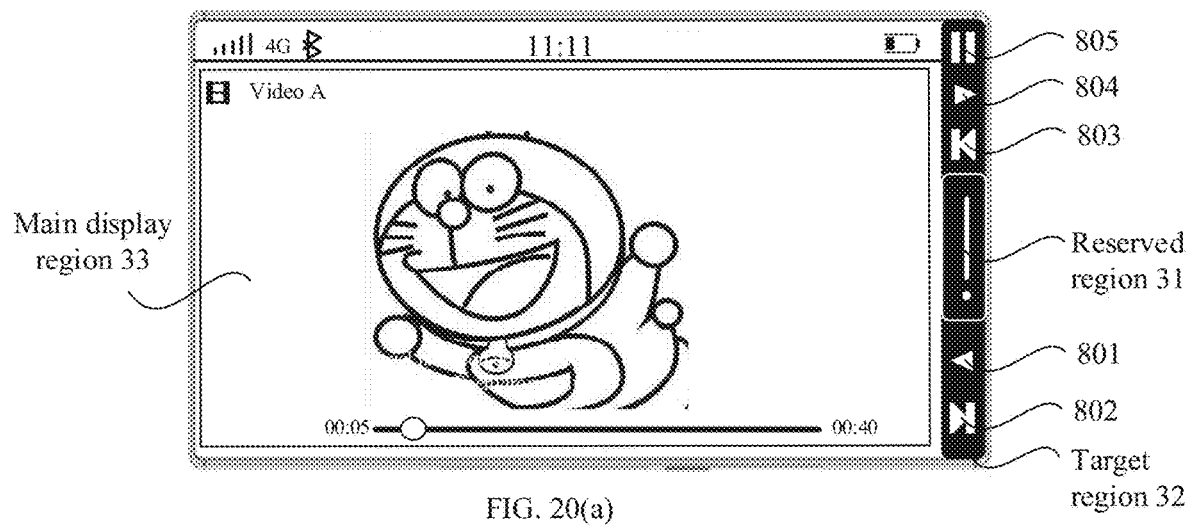
FIG. 20(a) and FIG. 20(b) are a schematic diagram 16 of an application scenario of a display method according to an embodiment of the present invention.

For example, as shown in FIG. 20(a), the terminal is currently running, in the landscape mode, a video player application to play a video A. In this case, the terminal may display a setting button for video playback, for example, a fast-forward button 802, a next episode button 801, a rewind button 803, a previous episode button 804, a pause button 805, and the like in the target region 32. In this way, these setting buttons do not affect watching the video A in the main display region 33 by the user, and the user can conveniently find these setting buttons quickly when requiring these setting buttons.

Figure 20B:
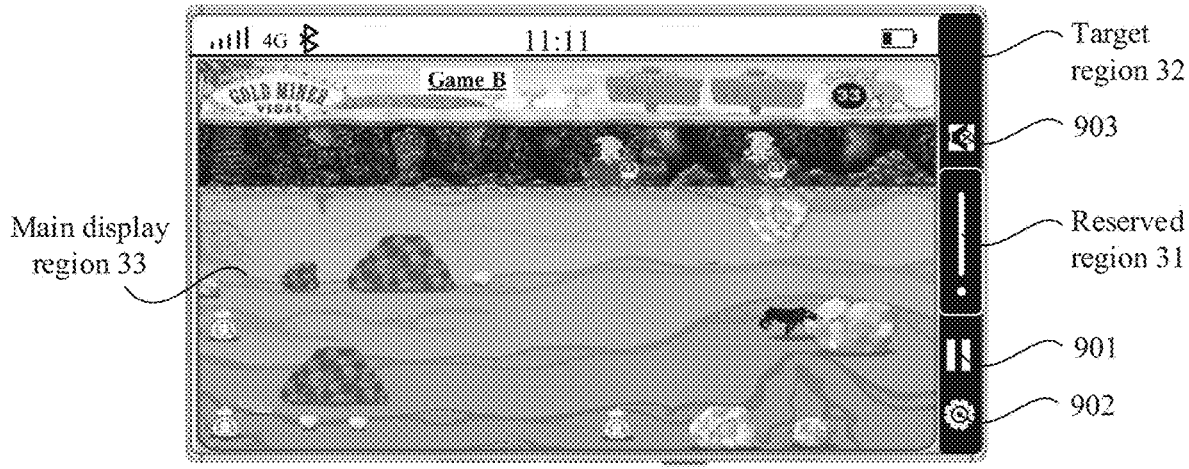

For another example, as shown in FIG. 20(b), the terminal is currently running a game application B in the landscape mode. In this case, the terminal may display a setting button for game running, for example, a pause button 901, a setting button 902, and a mute button 903 in the target region 32. In this way, these setting buttons do not affect performing a game operation in the main display region 33 by the user, and the user can conveniently find these setting buttons quickly when requiring these setting buttons.

Certainly, when the terminal runs an application in the portrait mode, an icon such as a setting button of the application may also be displayed in the target region 32. This is not limited in this embodiment of the present invention.

Similarly, when the setting button of the currently running application is displayed in the target region 32, the background color of the target region 32 may be set as a color the same as that of the reserved region 31. For example, the reserved region 31 is black. Therefore, the background color of the target region 32 may also be set as black, so that the target region 32 and the reserved region 31 can be visually integrated, to avoid a case in which display content of the target region 32 is excessively distinct and consequently viewing experience of the user is affected.

In another possible design method, when the scenario description data obtained in step 501 includes a current screen status of the terminal, the terminal may alternatively display related target display content in the target region 32 based on the screen status.

For example, as shown in FIG. 21(a), when the screen status of the terminal is a black screen state, an icon (that is, the target display content) such as a current system time that the user pays relatively high attention to may be displayed in the target region 32. The main display region 33 of the terminal may still remain in the black screen state, thereby reducing power consumption of the terminal. For another example, as shown in FIG. 21(*b*), when the screen status of the terminal is a lock screen state, the user may be prompted in the target region 32 to enroll a fingerprint in a fingerprint recognition region, to help the user quickly unlock the terminal.

Alternatively, when the screen status of the terminal is the lock screen state, as shown in FIG. 22(*a*), an unread new message may be further displayed in the target region 32. For example, a new short messaging service message received by the terminal is displayed in a part or all of the target region 32, so that the user can quickly learn of content of the unread short messaging service message in the lock screen state. When the received new short messaging service message is displayed, an icon of the unread short messaging service message may be displayed, or content of the short messaging service message may be displayed in a scrolling playing manner. This is not limited in this embodiment of the present invention. Certainly, when the screen status of the terminal is the lock screen state, as shown in FIG. 22(*b*), a to-be-displayed icon in the status bar may also be displayed in the target region 32. This is not limited in this embodiment of the present invention.

In another possible design method, when the scenario description data obtained in step 501 includes a current scenario status of the terminal, the terminal may alternatively display related target display content in the target region 32 based on the scenario status.

For example, as shown in FIG. 23(*a*), when the terminal is carried by a user that is in a motion state such as running, the terminal may display a detected physiological parameter (that is, the target display content) related to motion, such as a heart rate or a running speed of the user in the target region 32. In this way, the user can immediately learn of a current motion status without unlocking the terminal. As shown in FIG. 23(*b*), when the terminal is carried by a user that is in a vehicle taking state, the terminal may display currently detected travel information related to a travel, such as a vehicle speed or weather in the target region 32. This is not limited in this embodiment of this application.

In another possible design method, when the scenario description data obtained in step 501 is used to indicate that the terminal is currently in a selfie mode, the terminal may further lighten the target region 32 to serve as an illuminator or a flash, to improve a shooting effect.

Figure 24:
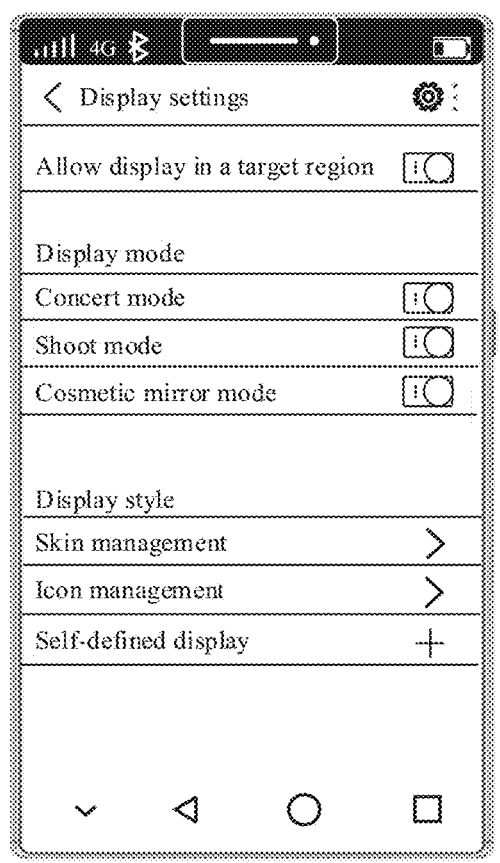
FIG. 24 is a schematic diagram 20 of an application scenario of a display method according to an embodiment of the present invention.

Alternatively, the user may further manually set specific display content or a display style of the target region 32. For example, as shown in FIG. 24, the user may set the target region 32 to a concert mode. In this case, the target region 32 may display light bars of various colors to serve as fluorescent sticks. For another example, the user may further download various skins as a background of the target region 32. For another example, the user may set, through a customized display function, that an icon or a new message is displayed in a specific display position of the target region. For another example, when playing a song, the terminal may further display, in the target region 32 in a scrolling manner, lyrics that are being played in the song. This is not limited in this embodiment of the present invention.

Figure 25:
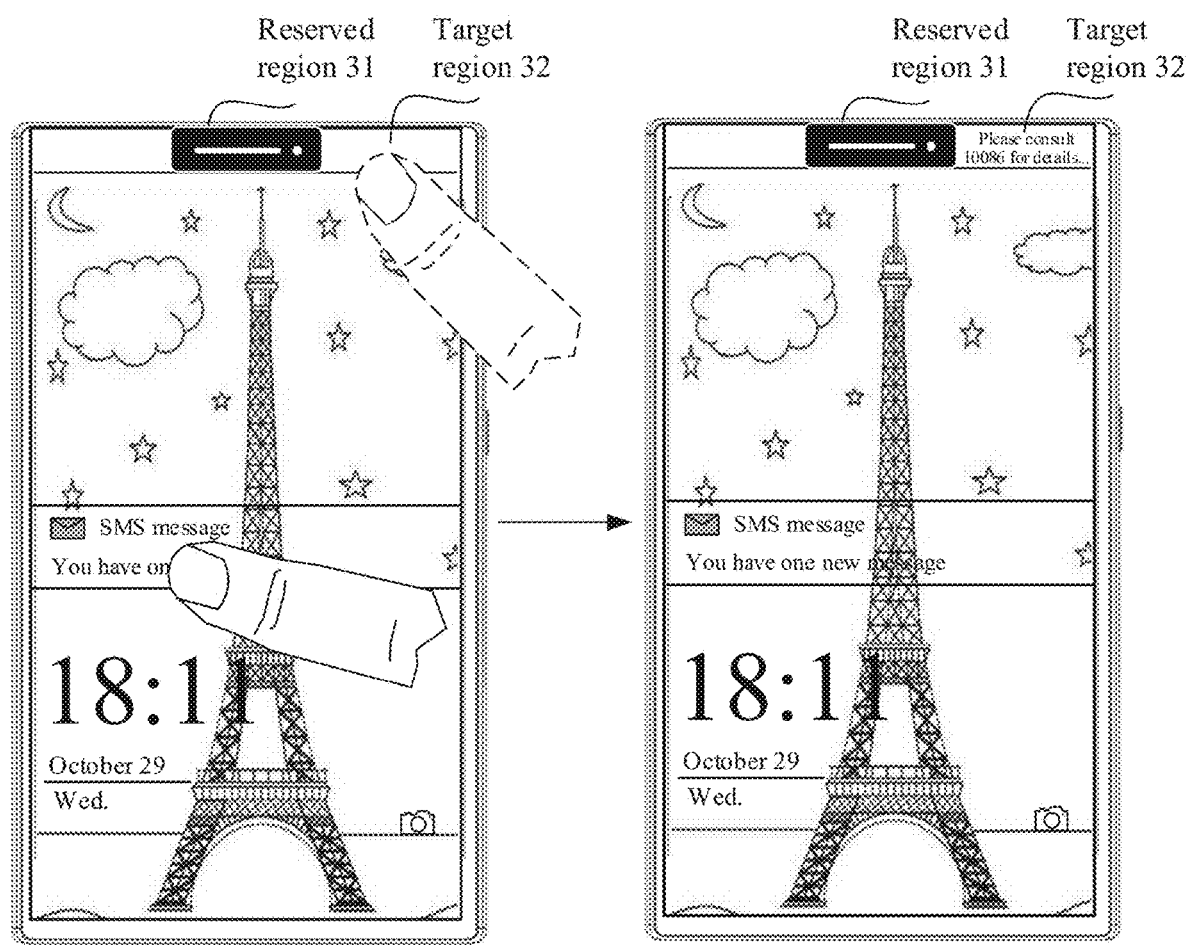
FIG. 25 is a schematic diagram 21 of an application scenario of a display method according to an embodiment of the present invention.

Certainly, the user may further change the display content in the target region 32 by performing an operation such as drag. For example, as shown in FIG. 25, the user may drag a received new short messaging service message alert to the target region 32, and after detecting a drag operation performed by the user on the short messaging service message alert, the terminal displays content of the received new short messaging service message in the target region 32 in a scrolling manner, so that the user can conveniently learn of the content of the short messaging service message in time.

Figure 26:
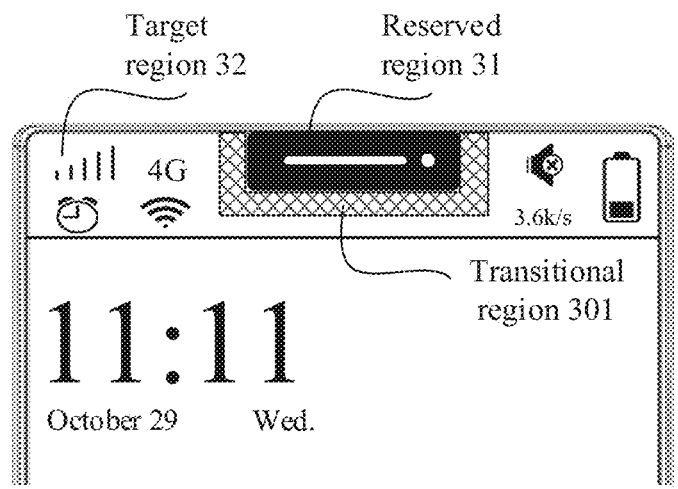
FIG. 26 is a schematic diagram 22 of an application scenario of a display method according to an embodiment of the present invention.

In addition, in this embodiment of this application, when the target region 32 displays the target display content, gradient processing may be performed on a displayed image at a position close to the reserved region 31, that is, the display content in the target region 32 is softly transitioned to the reserved region 31. As shown in FIG. 26, a periphery that is of the target region 32 and that is close to the reserved region 31 may be used as a transitional region 301. In this case, a gradient color from the target region 32 to the reserved region 31 may be filled in the transitional region 301 during display. For example, a background color of the target region 32 is green, and the reserved region 31 is black. In this case, a gradient color from green to black may be displayed in the transitional region 301 in a hierarchical manner, so that green in the target region 32 may be softly transitioned to black in the reserved region 31. In this way, the blanked reserved region 31 is not excessively distinct in visual display, and viewing experience of the user is improved.

Up to now, in the display method provided in this application, blanking processing is performed on the touchscreen, so that an effective display region of an existing terminal can be increased without changing a layout of a front panel of the terminal. In addition, for a blanked display region, the terminal may properly use, based on a current application scenario, a display region (that is, the target region 32) on two sides of the newly added blanked region, and display, in the target region 32, the target display content associated with the current application scenario. Therefore, a display effect of the terminal and use experience of the user are improved while a relatively high screen-to-body ratio is ensured.

It may be understood that, to implement the foregoing functions, the terminal and the like include corresponding hardware structures and/or software modules for performing the functions. A person skilled in the art should easily be aware that, with reference to the examples described in the embodiments disclosed in this specification, units, algorithms, and steps may be implemented by hardware or a combination of hardware and computer software in the embodiments of this application. Whether a function is performed by hardware or computer software driving hardware depends on particular applications and design constraints of the technical solutions. A person skilled in the art may use different methods to implement the described functions for each particular application, but it should not be considered that the implementation goes beyond the scope of the embodiments of this application.

In the embodiments of this application, the terminal may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that the module division in the embodiments of this application is an example, and is merely logical function division. There may be another division manner in actual implementation.

Figure 27:
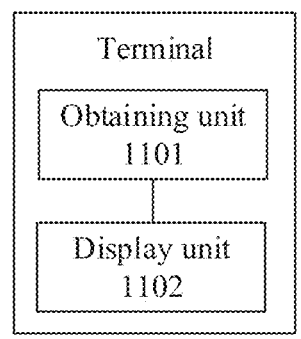
FIG. 27 is a schematic structural diagram 2 of a terminal according to an embodiment of the present invention.

For division into functional modules corresponding to functions, FIG. 27 is a possible schematic structural diagram of the terminal in the foregoing embodiments. The terminal includes an obtaining unit 1101 and a display unit 1102. The obtaining unit 1101 is configured to support the terminal in performing the process 501 in FIG. 6. The display unit 1102 is configured to support the terminal in performing the process 502 in FIG. 6. All related content of steps in the foregoing method embodiments may be cited in function descriptions of corresponding functional modules, and details are not described herein again.

Figure 28:
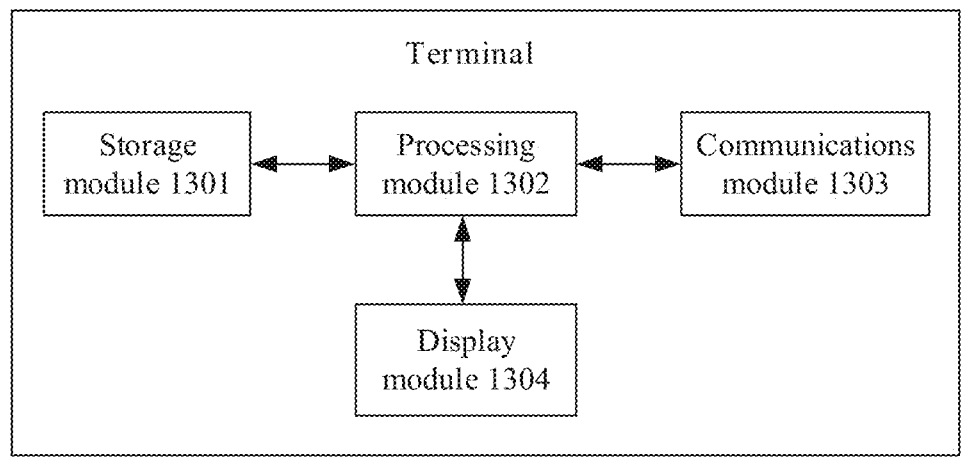
FIG. 28 is a schematic structural diagram 3 of a terminal according to an embodiment of the present invention.

When an integrated unit is used, FIG. 28 is a possible schematic structural diagram of the terminal in the foregoing embodiments. The processing module 1302 is configured to control and manage an action of the terminal. A communications module 1303 is configured to support the terminal in communicating with another network entity. A storage module 1301 is configured to store program code and data of the terminal. A display module 1304 is configured to display information entered by a user, information provided for the user, and various menus of the terminal.

For example, the processing module 1302 may be a processor or a controller, for example, may be a central processing unit (Central Processing Unit, CPU), a GPU, a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. The processing module 1302 may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The communications module 1303 may be a transceiver, a transceiver circuit, an input/output device, a communications interface, or the like. For example, the communications module 1303 may specifically be a Bluetooth apparatus, a Wi-Fi apparatus, a peripheral interface, or the like.

The storage module 1301 may be a memory. The memory may include a high-speed random access memory (RAM), and may further include a non-volatile memory, such as a magnetic disk storage component, a flash memory component, or another volatile solid-state storage component.

The display module 1304 may be a display screen, and a display may be specifically configured in a form of a liquid crystal display, an organic light-emitting diode, or the like. In addition, a touch panel may be integrated on the display, and is configured to collect a touch event on or near the touch panel, and send collected touch information to another component (for example, a processor).

When the processing module 1302 is a processor, the communications module 1303 is a radio frequency circuit, the storage module 1301 is a memory, and the display module 1304 is a touchscreen with an irregular shape shown in FIG. 3A to FIG. 3C, the terminal provided in this embodiment of the present invention may be the mobile phone 100 shown in FIG. 2.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, some or all of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium, for example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk Solid State Disk, (SSD)), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A display method, implemented by a terminal, the display method comprising:
    displaying, in a first target region or a second target region, a status bar comprising one or more icons associated with a function of the terminal, wherein the one or more icons comprise at least one of a WI-FI icon, a battery level icon, a signal strength icon, a network type icon, or a portrait locking icon, wherein the terminal comprises a reserved region, a front panel component disposed in the reserved region and comprising a camera or an earpiece, and a touchscreen comprising a main display region, the first target region, and the second target region, and wherein the first target region and the second target region are separated by the reserved region;
    displaying a first user interface of a first application in the main display region;
    displaying a shortcut of a second application in the first target region or the second target region;
    receiving an operation triggering the shortcut; and
    displaying, in response to the operation, a second user interface of the second application in the main display region.

2. The display method of claim 1, further comprising:
    receiving an expanding operation on the first target region or the second target region; and
    removing, in response to the expanding operation, the one or more icons from the first target region or the second target region.

3. The display method of claim 2, further comprising:
    displaying, in response to the expanding operation, an expanded status bar in a form of a page or a window card in the main display region; and
    displaying a first icon status bar icon and a second icon status bar icon for controlling the function of the terminal in the main display region in the expanded status bar, wherein the first icon status bar icon and the second icon status bar icon are displayed in the page or the window card.

4. The display method of claim 2, wherein the expanding operation comprises one of a tap operation or a drop-down operation.

5. The display method of claim 2, further comprising displaying, in response to the expanding operation, the one or more icons on a side of the main display region, wherein the side of the main display region is close to the reserved region.

6. The display method of claim 1, further comprising displaying a status bar icon in the first target region or the second target region when the terminal is in a portrait mode and an application running on the terminal is not in a full-screen display mode.

7. The display method of claim 1, further comprising:
displaying a closed status bar in the first target region or the second target region; and
displaying a status bar icon in the closed status bar.

8. A computer program product comprising computer-executable instructions stored on a non-transitory computer-readable medium that, when executed by one or more processors, cause a terminal to:
display, in a first target region or a second target region, a status bar comprising one or more icons associated with a function of the terminal, wherein the one or more icons comprise at least one of a WI-FI icon, a battery level icon, a signal strength icon, a network type icon, or a portrait locking icon, wherein the terminal comprises a reserved region, a front panel component disposed in the reserved region and comprising a camera or an earpiece, and a touchscreen comprising a main display region, the first target region, and the second target region, and wherein the first target region and the second target region are separated by the reserved region;
display a first user interface of a first application in the main display region;
display a shortcut of a second application in the first target region or the second target region;
receive an operation triggering the shortcut in the first target region or the second target region; and
display a second user interface of the second application in the main display region.

9. The computer program product of claim 8, wherein when executed by the one or more processors, the instructions further cause the terminal to:
receive an expanding operation on the first target region or the second target region; and
remove, in response to the expanding operation, the one or more icons displayed in the main display region from the first target region or the second target region.

10. The computer program product of claim 9, wherein when executed by the one or more processors, the instructions further cause the terminal to:
display, in response to the expanding operation, an expanded status bar in a form of a page or a window card in the main display region; and
display a first icon status bar icon and a second icon status bar for controlling the function of the terminal in the main display region in the expanded status bar, wherein the first icon status bar icon and the second icon status bar are displayed in the page or the window card.

11. The computer program product of claim 9, wherein when executed by the one or more processors, the instructions further cause the terminal to display, in response to the expanding operation, the one or more icons on a side of the main display region, wherein the side of the main display region is close to the reserved region.

12. The computer program product of claim 8, wherein when executed by the one or more processors, the instructions further cause the terminal to display a status bar icon in the first target region or the second target region when the terminal is in a portrait mode and an application currently run on the terminal is not in a full-screen display mode.

13. A terminal, comprising:
a side comprising a reserved region;
a front panel component comprising at least one of a camera or an earpiece and disposed in the reserved region;
a touchscreen disposed on the side and comprising a main display region below the reserved region, a first target region, and a second target region, wherein the first target region and the second target region are separated by the reserved region;
one or more processors coupled to the touchscreen; and
a memory coupled to the one or more processors and configured to store instructions that, when executed by the one or more processors, cause the terminal to be configured to:
display, in the first target region or the second target region, a status bar comprising one or more icons associated with a function of the terminal, wherein the one or more icons comprise at least one of a WI-FI icon, a battery level icon, a signal strength icon, a network type icon, or a portrait locking icon;
display a first user interface of a first application in the main display region;
display a shortcut of a second application in the first target region or the second target region;
receive an operation triggering the shortcut in the first target region or the second target region; and
display a second user interface of the second application in the main display region.

14. The terminal of claim 13, wherein the main display region is a rounded rectangle comprising at least one rounded corner or is a rectangle having a larger area than the first target region and the second target region.

15. The terminal of claim 13, wherein the instructions further cause the terminal to:
receive an expanding operation on the first target region or the second target region; and
remove, in response to the expanding operation, the one or more icons from the first target region or the second target region.

16. The terminal of claim 15, wherein the instructions further cause the terminal to:
display, in response to the expanding operation, an expanded status bar in a form of a page or a window card in the main display region; and
display a first icon status bar icon and a second icon status bar icon for controlling the function of the terminal in the main display region in the expanded status bar, wherein the first icon status bar icon and the second icon status bar icon are displayed in the page or the window card.

17. The terminal of claim 15, wherein the expanding operation includes one of a tap operation or a drop-down operation.

18. The terminal of claim 15, wherein the instructions further cause the terminal to display, in response to the expanding operation, the one or more icons on a side of the main display region, wherein the side of the main display region is close to the reserved region.

19. The terminal of claim 13, wherein the instructions further cause the terminal to display a status bar icon in the first target region or the second target region when the terminal is in a portrait mode and an application currently run on the terminal is not in a full-screen display mode.

20. The terminal of claim 13, wherein the instructions further cause the terminal to:
- display a closed status bar in the first target region or the second target region; and
- display a status bar icon in the closed status bar.

* * * * *